(12) United States Patent
Barbosa Abreu et al.

(10) Patent No.: US 12,490,284 B1
(45) Date of Patent: Dec. 2, 2025

(54) METHODS AND APPARATUSES FOR COEXISTENCE OF SIDELINK COMMUNICATIONS

(71) Applicant: TOYOTA JIDOSHA KABUSHIKI KAISHA, Toyota (JP)

(72) Inventors: Renato Barbosa Abreu, Aalborg (DK); Nuno Manuel Kiilerich Pratas, Gistrup (DK); Thomas Haaning Jacobsen, Noerresundby (DK); Takayuki Shimizu, Mountain View, CA (US); Berthold Panzner, Holzkirchen (DE); Claude Arzelier, Varna (BG)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/300,474

(22) Filed: Aug. 14, 2025

Related U.S. Application Data

(63) Continuation of application No. PCT/JP2023/047251, filed on Dec. 28, 2023.
(Continued)

(51) Int. Cl.
*H04W 4/00* (2018.01)
*H04W 72/25* (2023.01)
(Continued)

(52) U.S. Cl.
CPC ........... *H04W 72/40* (2023.01); *H04W 72/25* (2023.01); *H04W 74/0808* (2013.01)

(58) Field of Classification Search
CPC .. H04W 72/40; H04W 72/25; H04W 74/0808
(Continued)

(56) References Cited

U.S. PATENT DOCUMENTS 12,058,740 B2 * 8/2024 Liu .................. H04W 72/0446
2022/0086918 A1 * 3/2022 Liu ........................ H04W 24/08
(Continued)

OTHER PUBLICATIONS

"Dynamic co-channel coexistence for LTE sidelink and NR sidelink," 3GPP TSG RAN WG1 Meeting #111, R1-2211300, Nov. 14-18, 2022, 11 Pages.
(Continued)

*Primary Examiner* — Marceau Milord
(74) *Attorney, Agent, or Firm* — Finnegan, Henderson, Farabow, Garrett, and Dunner, LLP

(57) ABSTRACT

Disclosed are methods, apparatuses, and systems for resource selection for a user equipment (UE) in a first sidelink communication. The method includes: determining, by a first sidelink communication module, a selection window; setting at least one first threshold parameter for a resource exclusion at the first sidelink communication module; initializing a candidate resource set; receiving, from a second sidelink communication module, at least one of: at least one second threshold parameter used for a resource exclusion at the second sidelink communication module, sidelink sensing information obtained by the second sidelink communication module, or resource reservation information collected by the second sidelink communication module; determining one or more final candidate resources in the first sidelink communication using the at least one first threshold parameter and the at least one information received from the second sidelink communication module; and reporting the determined one or more final candidate resources to a higher layer.

10 Claims, 12 Drawing Sheets

Related U.S. Application Data

(60) Provisional application No. 63/485,064, filed on Feb. 15, 2023.

(51) Int. Cl.
  *H04W 72/40* (2023.01)
  *H04W 74/0808* (2024.01)

(58) Field of Classification Search
  USPC .......................................................... 370/329
  See application file for complete search history.

(56) References Cited

U.S. PATENT DOCUMENTS

| | | | |
|---|---|---|---|
| 2022/0322229 A1 | 10/2022 | Ye et al. | |
| 2023/0319788 A1* | 10/2023 | Zhang | H04W 72/1263 |
| 2024/0114485 A1* | 4/2024 | Balasubramanian | H04W 72/20 |
| 2024/0121848 A1* | 4/2024 | Chen | H04W 76/19 |
| 2024/0155639 A1* | 5/2024 | Liu | H04L 5/001 |
| 2024/0172221 A1* | 5/2024 | Chen | H04W 72/543 |
| 2024/0215102 A1* | 6/2024 | Chen | H04W 76/27 |
| 2024/0224242 A1* | 7/2024 | Liu | H04W 72/04 |
| 2024/0356708 A1* | 10/2024 | Chen | H04W 28/0221 |
| 2024/0357569 A1* | 10/2024 | Abreu | H04W 72/566 |
| 2025/0039934 A1* | 1/2025 | Zhao | H04W 74/0816 |
| 2025/0039941 A1* | 1/2025 | Hu | H04L 5/0051 |
| 2025/0055579 A1* | 2/2025 | Medina | H04L 5/0048 |
| 2025/0063395 A1* | 2/2025 | Chen | H04W 76/27 |
| 2025/0081272 A1* | 3/2025 | Chen | H04W 8/22 |
| 2025/0088891 A1* | 3/2025 | Jiang | H04W 24/10 |
| 2025/0106670 A1* | 3/2025 | Chen | H04W 36/00837 |
| 2025/0212257 A1* | 6/2025 | Ma | H04W 74/0891 |

OTHER PUBLICATIONS

"Discussion on co-channel coexistence of LTE-SL and NR-SL," 3GPP TSG RAN WG1 #111, R1-2211987, Nov. 14-18, 2022, 10 Pages.

"On Co-channel Coexistence for LTE Sidelink and NR Sidelink," 3GPP TSG RAN WG1 #110bis-e, R1-2208358, Oct. 10-19, 2022, 16 Pages.

* cited by examiner

METHODS AND APPARATUSES FOR COEXISTENCE OF SIDELINK COMMUNICATIONS

CROSS-REFERENCE TO RELATED PATENT APPLICATION

This application is a continuation of PCT/JP2023/047251, filed on Dec. 28, 2023, which claims the benefit of U.S. Provisional Application No. 63/485,064, filed on Feb. 15, 2023, entitled "METHOD AND APPARATUS FOR COEXISTANCE OF SIDELINK COMMUNICATIONS," the entirety of each of which is incorporated by reference herein.

TECHNICAL FIELD

Apparatuses and methods consistent with the present disclosure relate generally to communications, more specifically, methods, systems, and devices for resource selection in sidelink communications.

BACKGROUND ART

Sidelink communication technology enables direct communication between two or more devices, for example, two or more vehicles in a vehicle-to-everything (V2X) communication. A user equipment (UE) in a sidelink communication may autonomously monitor a resource pool to determine which resources are available to be selected for transmissions. When the UE includes two different sidelink communication modules and thus supports co-existence of two sidelink communications, sensing results from a second sidelink communication module may be provided to a first sidelink communication module for resource selection in the first sidelink communication. However, the two sidelink communication modules may have different thresholds for resource exclusion, and this may cause a problem. For example, if the first sidelink communication module uses a higher threshold for resource exclusion than the second sidelink communication module, the first sidelink communication module may end up selecting resources which should have been excluded (i.e., deemed occupied) from second sidelink communication system point of view, thereby causing interference and/or collisions. On the other hand, if the first sidelink communication module uses a lower threshold for resource selection than the second sidelink communication module, the first sidelink communication module may end up excluding resources which could have been considered available from the second sidelink communication system point of view, therefore unnecessarily eliminating available candidate resources. Systems and methods that are capable of dynamically adjusting thresholds for resource exclusion are desired.

SUMMARY OF INVENTION

According to some embodiments of the present disclosure, there is provided a UE including a first sidelink communication module for resource selection in a first sidelink communication. The UE includes a memory storing an instruction; and a processor configured to execute the instruction stored in the memory to: determine a selection window and set at least one first threshold parameter for a resource exclusion at the UE; initialize a candidate resource set including one or more resources in the first sidelink communication; receive, from a second sidelink communication module, at least one of: at least one second threshold parameter used for a resource exclusion at the second sidelink communication module, sidelink sensing information obtained by the second sidelink communication module, or resource reservation information collected by the second sidelink communication module; determine one or more final candidate resources in the first sidelink communication using the at least one first threshold parameter and the at least one information received from the second sidelink communication module; and report the determined one or more final candidate resources to a higher layer for selection of one or more transmission resources in the first sidelink communication.

According to some embodiments of the present disclosure, there is provided a second UE for resource selection in a second sidelink communication. The second UE includes a memory storing an instruction; and a processor configured to execute the instruction stored in the memory to: collect sidelink sensing information and resource reservation information for one or more reserved resources in the second sidelink communication; determine one or more candidate resources based on the sidelink sensing information for the one or more reserved resources in the second sidelink communication by performing a resource exclusion on the one or more candidate resources based on at least one threshold parameter; select one or more resources among the one or more candidate resources; and transmit, to a first UE in a first sidelink communication, at least one of: the at least one threshold parameter used for the resource exclusion at the second UE, the sidelink sensing information, or the resource reservation information.

According to some embodiments of the present disclosure, there is provided a method for resource selection for a UE in a first sidelink communication. The method includes determining, by a first sidelink communication module of the UE, a selection window; setting, by the first sidelink communication module, at least one first threshold parameter for a resource exclusion at the first sidelink communication module; initializing, by the first sidelink communication module, a candidate resource set including one or more resources in the first sidelink communication; receiving, from a second sidelink communication module, at least one of: at least one second threshold parameter used for a resource exclusion at the second sidelink communication module, sidelink sensing information obtained by the second sidelink communication module, or resource reservation information collected by the second sidelink communication module; determining, by the first sidelink communication module, one or more final candidate resources in the first sidelink communication using the at least one first threshold parameter and the at least one information received from the second sidelink communication module; and reporting, by the first sidelink communication module, the determined one or more final candidate resources to a higher layer for selection of one or more transmission resources in the first sidelink communication.

According to some embodiments of the present disclosure, there is provided a method for resource selection in a second sidelink communication. The method includes collecting, by a second UE in the second sidelink communication, sidelink sensing information and resource reservation information for one or more reserved resources in the second sidelink communication; determining, by the second UE, one or more candidate resources based on the sidelink sensing information for the one or more reserved resources in the second sidelink communication by performing a resource exclusion on the one or more candidate resources based on at least one threshold parameter; selecting, by the second UE, one or more resources among the one or more candidate resources; and transmitting, to a first UE in a first sidelink communication, at least one of: the at least one threshold parameter used for the resource exclusion at the second UE, the sidelink sensing information, or the resource reservation information.

According to some embodiments of the present disclosure, there is provided a non-transitory computer-readable medium storing instructions that are executable by one or more processors of a UE in a sidelink communication to perform a method. The method includes determining, by a first sidelink communication module of the UE, a selection window; setting, by the first sidelink communication module, at least one first threshold parameter for a resource exclusion at the first sidelink communication module; initializing, by the first sidelink communication module, a candidate resource set including one or more resources in a first sidelink communication; receiving, from a second sidelink communication module, at least one of: at least one second threshold parameter used for a resource exclusion at the second sidelink communication module, sidelink sensing information obtained by the second sidelink communication module, or resource reservation information collected by the second sidelink communication module; determining, by the first sidelink communication module, one or more final candidate resources in the first sidelink communication using the at least one first threshold parameter and the at least one information received from the second sidelink communication module; and reporting, by the first sidelink communication module, the determined one or more final candidate resources to a higher layer for selection of one or more transmission resources in the first sidelink communication.

According to some embodiments of the present disclosure, there is provided a non-transitory computer-readable medium storing instructions that are executable by one or more processors of a second UE in a second sidelink communication to perform a method. The method includes collecting, by the second UE, sidelink sensing information and resource reservation information for one or more reserved resources in the second sidelink communication; determining, by the second UE, one or more candidate resources based on the sidelink sensing information for the one or more reserved resources in the second sidelink communication by performing a resource exclusion on the one or more candidate resources based on at least one threshold parameter; selecting, by the second UE, one or more resources among the one or more candidate resources; and transmitting, to a first UE in a first sidelink communication, at least one of: the at least one threshold parameter used for the resource exclusion at the second UE, the sidelink sensing information, or the resource reservation information.

DESCRIPTION OF EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of systems, apparatuses, and methods consistent with aspects related to the present disclosure as recited in the appended claims.

Figure 1:
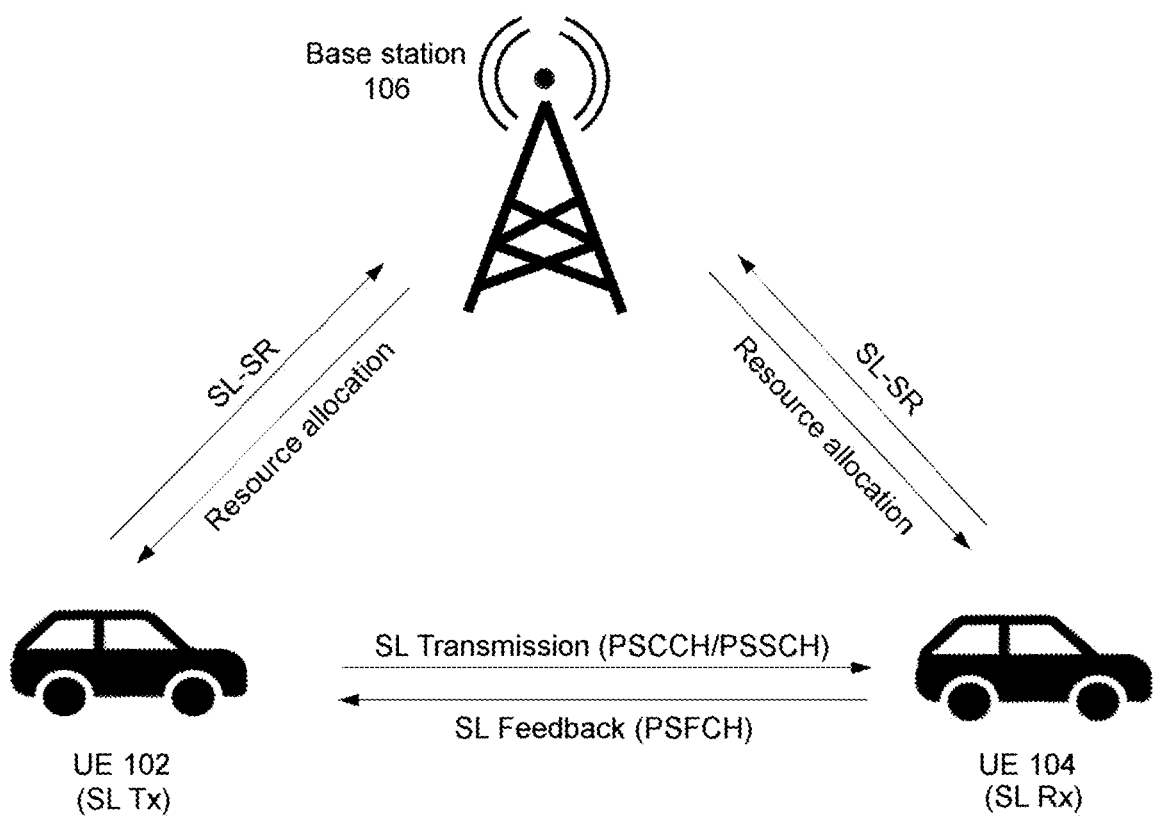
FIG. 1 is a schematic diagram illustrating a first mode for resource allocation in a sidelink communication, consistent with some embodiments of the present disclosure.

FIG. 1 is a schematic diagram illustrating a first mode for resource allocation in a sidelink communication, consistent with some embodiments of the present disclosure. Referring to FIG. 1, a communication system includes a UE 102, a UE 104, and a base station 106. The UE 102 may be a transmitter (Tx) UE in a sidelink communication (SL), and the UE 104 may be a receiver (Rx) UE in the sidelink communication. The UE 102 and the UE 104 can be any form of UEs, for example, two vehicles in a V2X communication. The base station 106 can be any base station (e.g., gNodeB (gNB)) currently existing, such as base stations for long term evolution (LTE) or new radio (NR), or base stations for a future generation ($6^{th}$ generation (6G), $7^{th}$ generation (7G), or any other future generation) radio access technology (RAT). The UE 102 and the UE 104 may communicate with each other using sidelink signals. For example, the UE 102 may transmit a physical sidelink control channel (PSCCH) and/or physical sidelink shared channel (PSSCH) to the UE 104, and in response, the UE 104 may transmit a feedback signal, such as physical sidelink feedback channel (PSFCH) to the UE 102. The UE 102 and the UE 104 may also communicate with one or more other UEs in the sidelink communication.

In a first mode for resource allocation, when the UE 102 has data and/or signals to transmit, the UE 102 may request resources from the base station 106. For example, the UE 102 may transmit a signal, such as a sidelink-scheduling request (SL-SR) signal to the base station 106. In some embodiments, the UE 102 may transmit the SL-SR via sidelink-buffer status report (SL-BSR) signal. The SL-BSR can be a medium access control (MAC) control element (CE) from the UE 102 to the base station 106 and carries information on the amount of data in the buffer of the UE 102 to be sent out. In some embodiments, the UE 102 may transmit the SL-SR via physical uplink control channel (PUCCH) configured for a sidelink logical channel.

Upon receipt of the signal from the UE 102, the base station 106 may determine the resources to be allocated to the UE 102 and transmit a signal indicating the resource allocation to the UE 102. For example, the base station 106 may use dynamic sidelink grant downlink control information (DCI) to grant sidelink resources for up to three transmissions of a transport block. The base station 106 may also provide one or multiple configured grants allocating periodic sidelink resources to the UE 102. Similar to the UE 102, the UE 104 may also transmit an SL-SR to the base station 106, and the base station 106 may also perform resource allocation for the UE 104 and transmit a signal indicating the resource allocation for the UE 104.

In some embodiments, the base station 106 may configure a single resource pool spanning the whole spectrum including unavailable part(s) for the UE 102 and/or the UE 104. In some embodiments, the base station 106 may configure only one or more sub-channels containing one or more available physical resource blocks (PRBs) for the UE 102 and/or UE 104.

Figure 2:
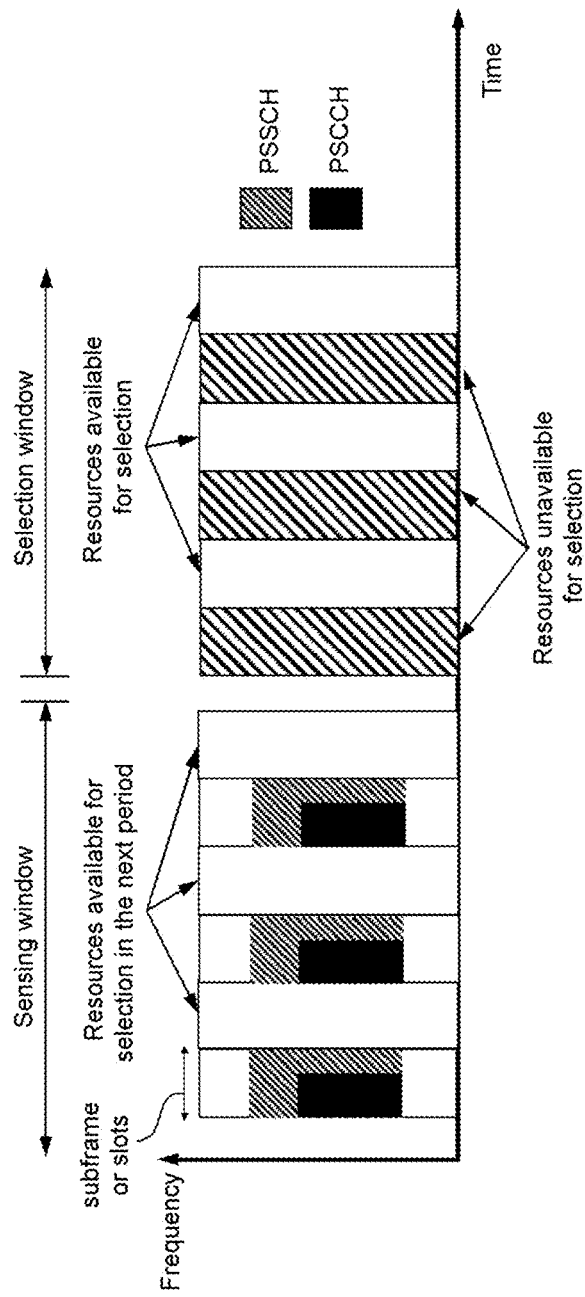
FIG. 2 is a schematic diagram illustrating a second mode for resource allocation in a sidelink communication, consistent with some embodiments of the present disclosure.

FIG. 2 is a schematic diagram illustrating a second mode for resource allocation in a sidelink communication, consistent with some embodiments of the present disclosure. In the second mode for the resource allocation, the UE 102 (and similarly the UE 104) may autonomously perform resource selection with the aid of a sensing procedure. For example, the UE 102 may perform a channel sensing over the configured sidelink transmission resource pool(s), in order to obtain information about the resources reserved by other UE(s). The channel sensing may be a background sensing and/or any other type of full sensing or partial sensing. Referring to FIG. 2, the UE 102 may perform a channel sensing in a sensing window and collect resource reservation information of other UE(s). For example, the UE 102 may collect resource reservation information of other UE(s) based on decoding of sidelink control information (SCI) included in a sidelink signal received from the other UE(s). The UE 102 may decode the SCI based on two stages: a first stage SCI (SCI format 1-A) and a second stage SCI (SCI format 2-A or 2-B) as defined in the 3rd Generation Partnership Project (3GPP) specifications. Based on the channel sensing, the UE 102 may determine candidate resources, for example, by excluding occupied, reserved, and/or unmonitored resources. As shown in FIG. 2, the radio resources can be divided into the resources in the time domain and the resources in the frequency domain. The candidate resources in the time domain may be, for example, one or more frames, subframes, slots, or symbols available for selection for the next period. In the frequency domain, the candidate resources may be, for example, one or more channels or sub-channels. FIG. 2 shows, for example, three available subframes or slots in the time domain among a plurality of subframes or slots. Each subframe or slot may include one or more symbols for PSCCH, and one or more symbols for PSSCH. Once a resource selection (or reselection) is triggered, during a selection window, the UE 102 may select resource(s) from the available sidelink resources based on the channel sensing information.

In some embodiments, the UE 102 may be configured with one of the two modes (the first mode and the second mode) for resource allocation. In some embodiments, the UE 102 may be configured with both modes for resource allocation. In some embodiments, the UE 102 may switch back and forth between the first mode and the second mode for resource allocation.

Figure 3A:
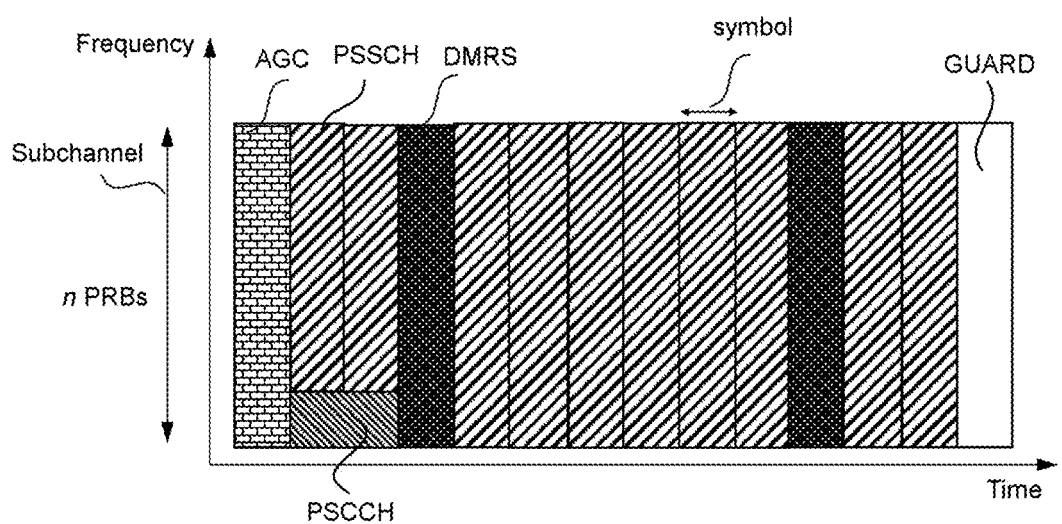
FIG. 3A is a schematic diagram illustrating a slot structure 300 in a sidelink communication.

FIG. 3A is a schematic diagram illustrating a slot structure 300 in a sidelink communication, consistent with some embodiments of the present disclosure. The slot 300 can be used for the first mode or the second mode of resource allocation described above. Referring to FIG. 3A, in the time domain, the slot 300 includes 14 orthogonal frequency division multiplexing (OFDM) symbols. Among the 14 OFDM symbols, two symbols are used for demodulation reference signal (DMRS), one symbol (the first symbol) is used for automatic gain control (AGC), one symbol (the last symbol) is used for a guard period, and the rest of the symbols are used for the PSCCH or PSSCH. In the frequency domain, the slot 300 may include one or more subchannels, each consisting of one or more physical resource blocks (PRBs).

In some embodiments, the slot 300 is used in legacy sidelink communication based on contiguous resource blocks. In this case, in the frequency domain, a resource pool may consist of a set of consecutive subchannels, where one subchannel consists of a number of consecutive resource blocks. The total number of resource blocks within a given resource pool can be configured with a value ranging from 10 to 275. Generally, sidelink resource allocation, sensing, and resource selection operations are based on subchannel. The size of subchannel is configurable and can take the values 10, 12, 15, 20, 25, 50, 75, and 100 PRBs, and there can be from 1 to 27 configured number of subchannels in a given resource pool. Referring to FIG. 3A, the PSCCH transmission is associated with the lowest subchannel of the scheduled PSSCH, indicating that the bandwidth size (in terms of number of PRBs) of PSCCH is always smaller or equal to the size of one subchannel. The configuration of the PSCCH is also part of the resource pool configuration and can be done, for example, by radio resource control (RRC) signaling. As an example, the PSCCH may be configured or pre-configured such that in the frequency domain, it can occupy a number (e.g., 10, 12, 15, 20, or 25, ≤subchannel size) of PRBs and in the time domain, it can occupy a number (e.g., 2 or 3) OFDM symbols which are configured by a resource pool signaling (e.g., RRC signaling) or pre-configured. The number of resources for PSCCH in the frequency domain can be indicated as sl-FreqResourcePSCCH, and the number of resources for PSCCH in the time domain can be indicated as sl-TimeResourcePSCCH.

Figure 3B:
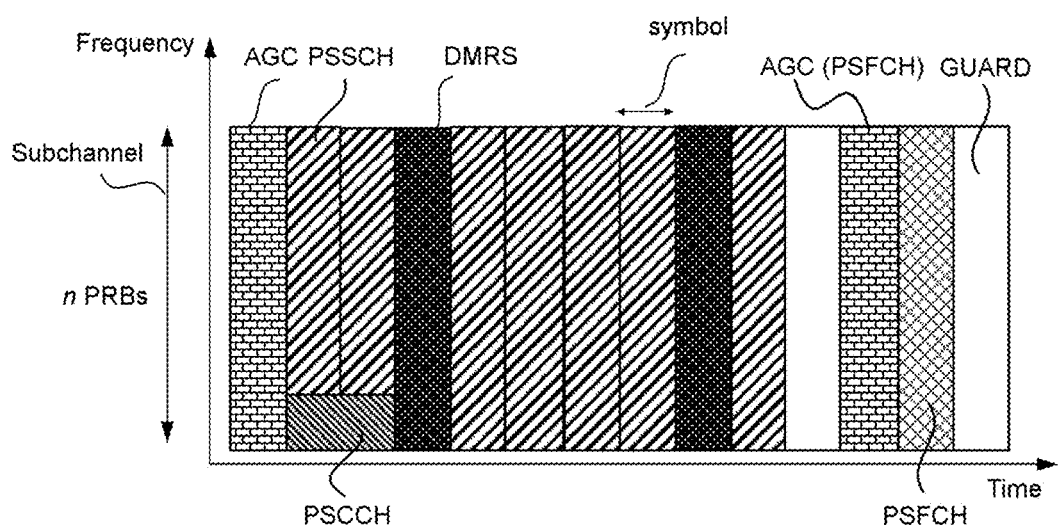
FIG. 3B is a schematic diagram illustrating another slot structure 310 in a sidelink communication, consistent with some embodiments of the present disclosure.

FIG. 3B is a schematic diagram illustrating another slot structure 310 in a sidelink communication, consistent with some embodiments of the present disclosure. The slot 310 can be used for the first mode or the second mode of resource allocation described above. Referring to FIG. 3B, in the time domain, the slot 310 includes 14 OFDM symbols, in which one of the symbols is used for PSFCH, two of the symbols are used for DMRS, two of the symbols are used for the guard period, one of the symbols is used for AGC, and the rest of the symbols are used for the PSCCH or PSSCH. In the frequency domain, the slot 310 may include one or more subchannels, each consisting of one or more physical resource blocks (PRBs). Similar to the slot 300, as shown in FIG. 3B, the PSCCH transmission is associated with the lowest subchannel of the scheduled PSSCH.

Figure 4:
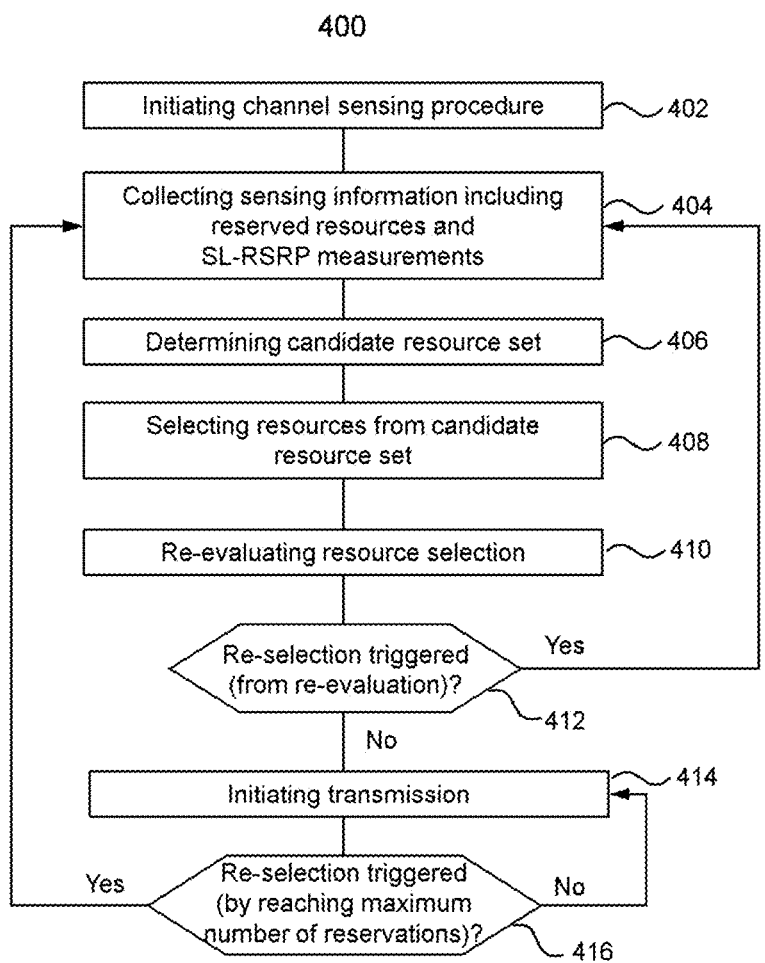
FIG. 4 is a schematic diagram illustrating a method for resource selection based on the above-noted second mode, consistent with some embodiments of the present disclosure.

FIG. 4 is a schematic diagram illustrating a method for resource selection based on the above-noted second mode of resource allocation, consistent with some embodiments of the present disclosure. Referring to FIG. 4, a method 400 includes a step 402 of performing a channel sensing (e.g., a background sensing or any other type of full sensing or partial sensing). For example, a Tx UE in a sidelink communication, such as the UE 102 of FIG. 1 may have data to transmit. Thus, the Tx UE may initiate a channel sensing procedure for resource selection. The Tx UE may perform a channel sensing in a sensing window (e.g., 100 ms or 1100 ms). In some embodiments, the Tx UE may monitor the resource pool and acquire information (e.g., resource reservation information and/or sidelink reference signal received power (RSRP) measurements) to be used during the resource selection procedure without (prior to) knowing that it has a transmission to perform.

The method 400 includes a step 404 of collecting sensing information including reserved resources and sidelink RSRP (SL-RSRP) measurements. For example, the Tx UE may perform channel sensing in the sensing window and collect resource reservation information of other UE(s) based on SCI decoding to identify candidate resources. The Tx UE may decode the SCI using two stages: a first stage SCI (SCI format 1-A) and a second stage SCI (SCI format 2-A or 2-B) as defined in the 3GPP specification.

The method 400 includes a step 406 of determining a candidate resource set. For example, after acquiring the sensing information from the channel sensing, the Tx UE may determine a candidate resource set, for example, by excluding occupied, reserved, and/or unmonitored resources.

The method 400 includes a step 408 of selecting resources among candidate resources. For example, the Tx UE may select resources semi-persistently, or up to a maximum number of reservations. The selection may be a random selection.

The method 400 includes a step 410 of re-evaluating resource selection. For example, the Tx UE may re-evaluate the selected resources before transmission by keeping decoding of one or more other UEs' PSCCH, and/or measuring SL-RSRP on the PSCCH or the corresponding PSSCH.

The method 400 includes a step 412 of determining, based on the re-evaluation, whether a resource re-selection is triggered. If the Tx UE determines that a resource re-selection is triggered, the method may iterate from the step 404. On the other hand, if the Tx UE determines that a resource re-selection is not triggered, the method may proceed with a step 414 of initiating a transmission of packet(s).

The method 400 includes a step 416 of determining whether a re-selection of resources is triggered by reaching a maximum number of reservations. If the Tx UE determines that the re-selection of resources is triggered by reaching a maximum number of reservations, the method iterates from the step 404. On the other hand, if the Tx UE determines that a resource re-selection is not triggered, the method may iterate from the step 414 for another transmission.

Figure 5:
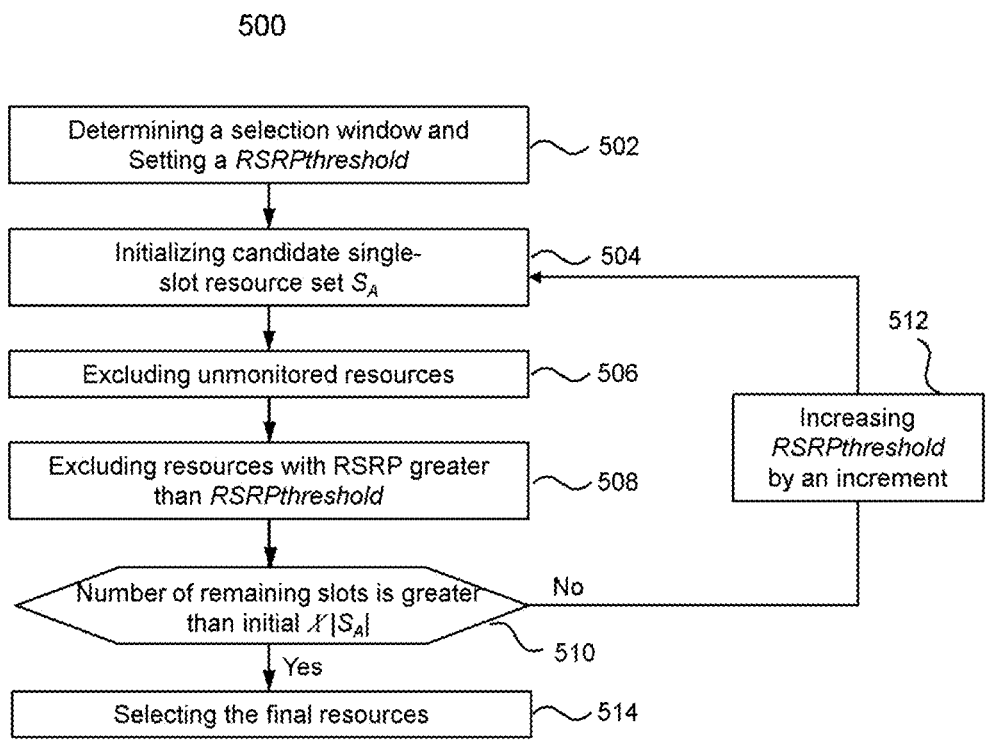
FIG. 5 is a schematic diagram illustrating a method for determining a resource candidate set, consistent with some embodiments of the present disclosure.

FIG. 5 is a schematic diagram illustrating a method for determining a resource candidate set based on the above-noted second mode of resource allocation, consistent with some embodiments of the present disclosure. Referring to FIG. 5, a method 500 includes a step 502 of determining a selection window and setting an RSRP threshold (RSRP-threshold). For example, a Tx UE in a sidelink communication, such as the UE 102 of FIG. 1, may determine a selection window for resource selection and set an RSRP-threshold. For example, the Tx UE may perform a channel sensing first, and based on the packet delay budget, determine a selection window T (e.g., T=[$T_1$, $T_2$], where $T_1 \leq 4$ ms, and $20 \leq T_2 \leq 100$ ms). The selection of the $T_1$ and $T_2$ values depends on the UE implementation and the packet delay budget. The RSRPthreshold may be configured by a network node (e.g., the base station 106 of FIG. 1) or pre-configured at the UE.

The method 500 includes a step 504 of initializing candidate single-slot resource set ($S_A$). For example, the Tx UE may collect a set $S_A$ of potential candidate resources that are within the defined selection window.

The method 500 includes a step 506 of excluding unmonitored resources. For example, the unmonitored resources are the resources that the Tx UE cannot sense due to its own transmission (i.e., half-duplex constraint) or other activities such as a discontinuous reception (DRX). The Tx UE may exclude one or more slots from the single-slot resource set of $S_A$.

The method 500 includes a step 508 of excluding resources with RSRP greater than the RSRPthreshold. For example, the Tx UE may exclude resources occupied or reserved by other UEs from the selection window if a corresponding RSRP exceeds a RSRP threshold.

The method 500 includes a step 510 of determining whether the number of remaining slots is greater than initial $X \cdot |S_A|$, where the value X may be configured or preconfigured from {0.2, 0.35, 0.5}. For example, the Tx UE determines whether the number of candidate resources is greater than $0.2 \cdot |S_A|$ (i.e., 20% of the total number of initial resources) in the selection window. If the Tx UE determines that the number of candidate resources is not greater than $X \cdot |S_A|$ in the selection window, at a step 512 the Tx UE increases the RSRP threshold by an increment and the method 500 iterates at step 504, until at least $X \cdot |S_A|$ resources are obtained. The increment can be 3 dB or any other value(s). On the other hand, if the Tx UE determines that the number of candidate resources is greater than $X \cdot |S_A|$ in the selection window, the method may proceed with a step 514 of selecting the final resources.

After selecting the final resources, the Tx UE may forward the potential candidate slots to higher layers (e.g., medium access control (MAC) layer) for a final resource selection.

The above-described embodiments are directed to sidelink channel sensing and resource selection in a single RAT. Some embodiments of the present disclosure are directed to sidelink channel sensing and resource selection for multi-RAT co-channel coexistence of different sidelink technologies. In these embodiments, for example, any combinations of a LTE sidelink, a NR sidelink, and a future generation (e.g., 6G, 7G, or any other future generation) sidelink may coexist and share the same channel. One or more embodiments of the present disclosure support channel sensing for resource selection in multi-RAT sidelink deployments.

Figure 6:
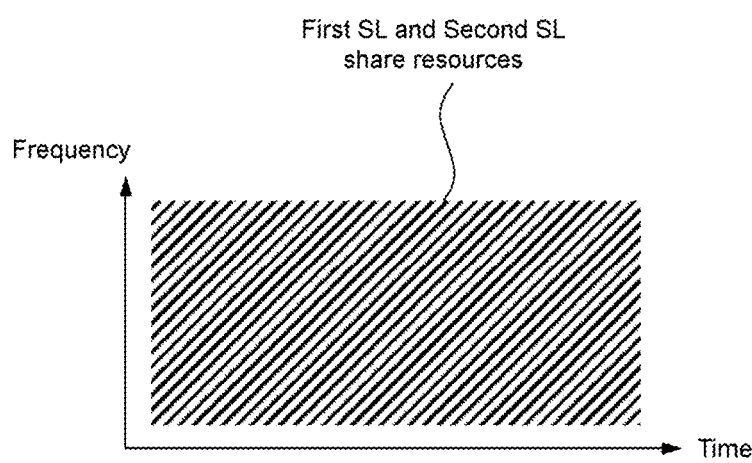
FIG. 6 is a schematic diagram illustrating a dynamic co-channel coexistence of a first sidelink (SL) communication and a second sidelink (SL) communication, consistent with some embodiments of the present disclosure.

FIG. 6 is a schematic diagram illustrating a dynamic co-channel coexistence of a first sidelink (SL) communication and a second sidelink (SL) communication, consistent with some embodiments of the present disclosure. In an embodiment, the first sidelink communication is NR sidelink communication and the second sidelink communication is LTE sidelink communication. In this embodiment, for example, the LTE sidelink communication uses 15 kHz sub-carrier spacing (SCS), while the NR sidelink communication uses 15 kHz SCS or a higher SCS (e.g., 30, 60 kHz).

As shown in FIG. 6, the first sidelink communication and the second sidelink communication share time and/or frequency resources.

Figure 7:
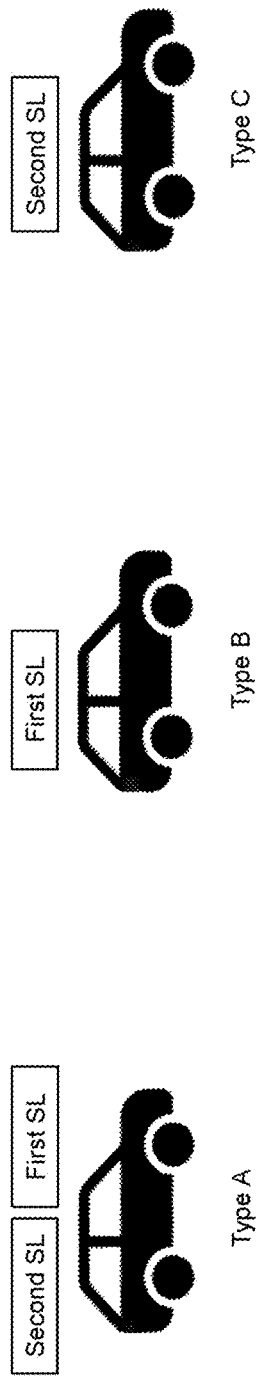
FIG. 7 is a schematic diagram illustrating device types for a dynamic co-channel coexistence of a first sidelink (SL) communication and a second sidelink (SL) communication, consistent with some embodiments of the present disclosure.

FIG. 7 is a schematic diagram illustrating device types for a dynamic co-channel coexistence of a first sidelink communication and a second sidelink communication, consistent with some embodiments of the present disclosure. Referring to FIG. 7, at least three types (Type A, Type B, and Type C) of devices are considered in this disclosure. A Type A device includes a first sidelink communication module and a second sidelink communication module. A Type B device only includes a first sidelink communication module. A Type C device only include a second sidelink communication module. For example, in an embodiment, a Type A device includes both an LTE sidelink module and an NR sidelink module, a Type B device only includes an NR sidelink module, and a Type C device only includes an LTE sidelink module. The first sidelink communication module and/or the second sidelink communication module can be software, hardware, or combination of software and hardware. The hardware may include one or more electronic circuits. Similarly, the LTE sidelink module can be software, hardware, or combination of software and hardware. The hardware may include one or more electronic circuits.

Still referring to FIG. 7, the Type A device includes a first sidelink communication module and a second sidelink communication module. The first sidelink communication module in the Type A device may support the use of the second sidelink sensing and resource reservation information to exclude resources from a set of available resources in its own resource selection procedures. In this case, however, a problem arises because the second sidelink communication module and the first sidelink communication module may have independent candidate resource selection and/or exclusion loops. In each resource exclusion loop, the threshold for resource exclusion may increase if the number of candidate resources is not sufficient. Therefore, from the sensing results obtained from the second sidelink communication module, the first sidelink communication module still does not know which resources the second sidelink communication module may consider valid candidate resources for transmission and which are not, as this determination depends on the threshold (e.g., a RSRP threshold and/or a received signal strength indicator (RSSI) threshold) applied for the resource exclusion. Therefore, even after obtaining the RSRP and/or RSSI values from second sidelink communication module, the first sidelink communication module may still have suboptimal resource selection choices in relation to second sidelink communication and this causes issues. For example, if the first sidelink communication module uses a higher threshold than the second sidelink communication module, the first sidelink communication module may end up selecting resources which should have been excluded (i.e., deemed occupied) from second sidelink communication system point of view, thereby causing more interference and/or collisions than second sidelink communication. On the other hand, if the first sidelink communication module uses a lower threshold than the second sidelink communication module, the first sidelink communication module may end up excluding resources which could have been considered available from the second sidelink communication system point of view, thereby unnecessarily limiting the candidate resources for the first sidelink communication. At least some embodiments of the present provide solutions for these issues.

Figure 8:
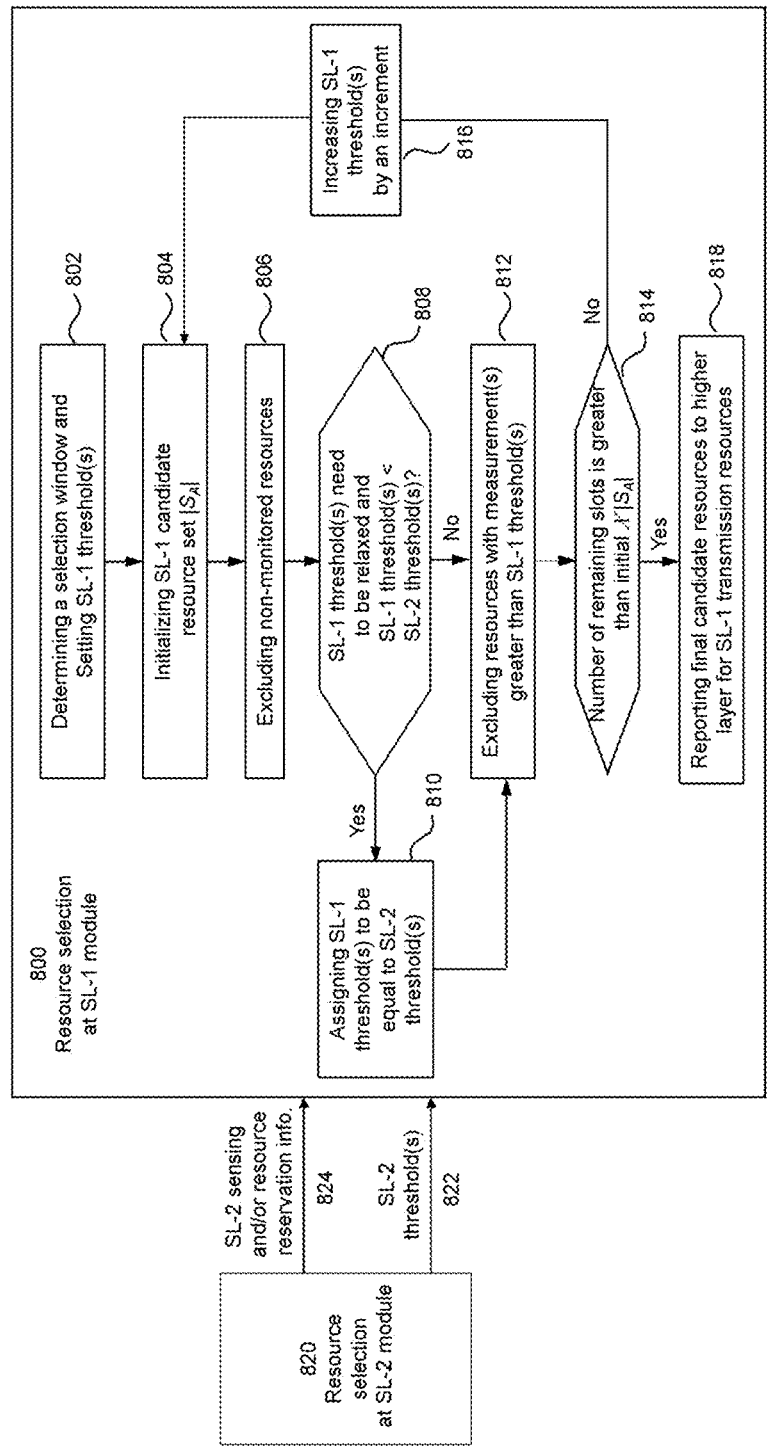
FIG. 8 is a schematic diagram illustrating a method for resource selection in a sidelink communication, consistent with some embodiments of the present disclosure.

FIG. 8 is a schematic diagram illustrating a method for resource selection in a sidelink communication, consistent with some embodiments of the present disclosure. As shown in FIG. 8, the method includes two processes (methods), i.e., a method 800 of resource selection at the first sidelink communication module (SL-1 module) and a method 820 of resource selection at a second sidelink communication module (SL-2 module). In an embodiment, the first sidelink communication is an NR sidelink communication, the second sidelink communication is an LTE sidelink communication.

In some embodiments, the method of FIG. 8 is performed by a single UE. The UE may be a Type A device, such as the Type A device in FIG. 7. The UE may include a first sidelink communication module and a second sidelink communication module. The first sidelink communication module may perform the method 800 and the second sidelink communication module may perform the method 820. In an embodiment, the first sidelink communication module and the second sidelink communication module of the UE may be two separate hardware compartments (components or devices) of the UE, each compartment having its own processor and/or memory. In this embodiment, in each compartment, a processor executes one or more computer instructions stored in a memory to perform the method 800 or 820. In another embodiment, the first sidelink communication module and the second sidelink communication module of the UE may be two separate memory devices storing corresponding computer instructions for the method 800 or 820. In another embodiment, the first sidelink communication module and the second sidelink communication module of the UE may be two distinct computer instructions included in the same memory device or different memory devices.

Referring to FIG. 8, the method 820 for resource selection is performed by the second sidelink communication module (SL-2 module). The method 820 may include a step (not shown) of collecting sidelink sensing information and resource reservation information for one or more reserved resources in the second sidelink communication. For example, the second sidelink communication module may perform a channel sensing (e.g., a background sensing or any other type of full sensing or partial sensing) in the second sidelink communication and perform measurements on sidelink signals. For example, the second sidelink communication module may measure one or more sidelink RSRP values and/or one or more sidelink RSSI values for the one or more reserved resources.

In some embodiments, the sidelink sensing information for the one or more reserved resources in the second sidelink communication includes least one of: one or more SL-RSRP measurement results associated with one or more reserved resources in a second sidelink communication, one or more SL-RSSI measurement results associated with the one or more reserved resources in the second sidelink communication, one or more times associated with one or more reserved transmissions in the second sidelink communication, one or more frequencies associated with the one or more reserved transmissions in the second sidelink communication, one or more resource reservation periods associated with the one or more reserved resources in the second sidelink communication, one or more priorities associated with the one or more reserved resources in the second sidelink communication, or information of one or more non-monitored resources in the second sidelink communication.

The method 820 may include a step (not shown) of determining one or more candidate resources based on the sidelink sensing information for the one or more reserved resources in the second sidelink communication by performing a resource exclusion on the one or more candidate resources based on at least one threshold parameter. For example, the second sidelink communication module may exclude one or more resources having a measurement value below the at least one threshold parameter. The at least one threshold parameter may be an SL-RSRP threshold applied for the resource exclusion, and/or an SL-RSSI threshold applied for the resource exclusion. The SL-RSRP threshold and the SL-RSSI threshold may be configured by a network (e.g., a base station) or pre-configured at the UE.

The method 820 may include a step (not shown) of selecting one or more resources among the one or more candidate resources. For example, the second communication module may select resources semi-persistently, or up to a maximum number of reservations. The selection may be a random selection.

The method 820 may include a step (not shown) of transmitting, to a first sidelink communication module, at least one of: the at least one threshold parameter used for the resource exclusion at the second sidelink communication, the sidelink sensing information, or the resource reservation information. For example, as shown in FIG. 8, the second sidelink communication module may transmit the at least one threshold parameter used for the resource exclusion in the second sidelink communication to the first sidelink communication module (a step 822). The second sidelink communication module may also transmit the sidelink sensing information and/or the resource reservation information to the first sidelink communication module (a step 824).

Still referring to FIG. 8, the method 800 for resource selection is performed by the first sidelink communication module (SL-1 module). The method 800 includes a step 802 of determining a selection window for the resource selection and setting at least one first threshold parameter (SL-1 threshold(s)) for a resource exclusion at the first sidelink communication module. For example, the first sidelink communication module may select a time duration of 100 ms or 1100 ms as the resource selection window. However, the selection window is not so limited, it can be any other time duration. The first sidelink communication module may also set at least one first threshold parameter, for example, an SL-RSRP threshold and/or an SL-RSSI threshold, for resource exclusion in the first sidelink communication. In some embodiments, the at least one first threshold parameter is included in a list of initial threshold parameters for resource exclusion of one or more resources reserved by one or more other UEs in the first sidelink communication. In some embodiments, the at least one first threshold parameter is included in a list of initial threshold parameters for resource exclusion of one or more resources reserved by one or more other UEs in the second sidelink communication. In some embodiments, the at least one first threshold parameter is included in a list of initial threshold parameters for resource exclusion of one or more resources reserved by one or more other UEs in the first sidelink communication, and a list of initial threshold parameters for resource exclusion of one or more resources reserved by one or more other UEs in the second sidelink communication. In some embodiments, the at least one first threshold parameter is determined based on at least one of: (1) one or more priorities of one or more other UEs in a second sidelink communication, or (2) one or more priorities associated with one or more transmissions in the first sidelink communication.

The method 800 includes a step 804 of initializing a candidate resource set including one or more resources in the first sidelink communication. In some embodiments, the resource is a single slot, and the first sidelink communication module may collect a set ($S_A$) of potential candidate resources that are within the defined selection window. In some embodiments, the resource may be a frame, a subframe, or a symbol.

The method 800 includes a step 806 of excluding one or more unmonitored resources. For example, the unmonitored resources are the resources that the UE cannot sense due to its own transmission (i.e., half-duplex constraint) or other activities such as discontinuous reception (DRX). For example, the first sidelink communication module may exclude one or more slots from the candidate resource set $S_A$.

The method 800 includes a step 808 of determining whether the at least one first threshold parameter (SL-1 threshold(s)) needs to be relaxed with respect to the second sidelink communication, and whether the at least one first threshold parameter is smaller than the at least one second threshold parameter (SL-2 threshold(s)). The step 808 is performed based on the information received from the second sidelink communication module at step 822 and/or step 824, as described above. For example, the first sidelink communication module may receive, from the second sidelink communication module, at least one of: at least one second threshold parameter used for a resource exclusion at the second sidelink communication module, sidelink sensing information obtained by the second sidelink communication module, or resource reservation information collected by the second sidelink communication module. In an embodiment, the first sidelink communication module may only receive the sidelink sensing information obtained by the second sidelink communication module and the resource reservation information collected by the second sidelink communication module, and derive the at least one second threshold parameter based on the received sidelink sensing information and/or the resource reservation information.

Referring back to the step 808, in some embodiments, whether the at least one first threshold parameter needs to be relaxed with respect to the second sidelink communication is decided based on a configuration by a network (e.g., a base station) or a pre-configuration at the UE. If the first sidelink communication module determines that the at least one first threshold parameter needs to be relaxed with respect to the second sidelink communication, and that the at least one first threshold parameter is smaller than the at least one second threshold parameter, at step 810, the first sidelink communication module assigns the at least one first threshold parameter to be equal to the at least one second threshold parameter. Further, at a step 812, the first sidelink communication module excludes, from the candidate resource set, one or more resources having a sensing measurement greater than the assigned at least one first threshold parameter (i.e., the at least one second threshold parameter). In some embodiments, the sensing measurement includes at least one of: one or more SL-RSRP values measured by the first sidelink communication module of the UE, one or more SL-RSSI values measured by the first sidelink communication module of the UE, one or more SL-RSRP values measured by the second sidelink communication module, or one or more SL-RSSI values measured by the second sidelink communication module.

On the other hand, if the first sidelink communication module determines that the at least one first threshold parameter does not need to be relaxed with respect to the second sidelink communication, or that the at least one first threshold parameter is not smaller than the at least one second threshold parameter, at step 812, the first sidelink communication module excludes the one or more resources having a sensing measurement greater than the at least one first threshold parameter.

The method 800 includes a step 814 of determining whether a number of remaining resources is equal to or greater than $X \cdot |S_A|$, where the X is a value selected from {0.2, 0.35, 0.5}. In some embodiments, the value X can be any other value configured by a network (e.g., a base station) or preconfigured at the UE. If the first sidelink communication module determines that the number of candidate resources is not greater than $X \cdot |S_A|$ in the selection window, at a step 816, the first sidelink communication module increases the at least one first threshold parameter by an increment and the method iterates at step 804, until at least $X \cdot |S_A|$ of resources are obtained. The increment can be 3 dB or any other value(s). On the other hand, if the first sidelink communication module determines that the number of candidate resources is greater than $X \cdot |S_A|$ in the selection window, the method may proceed with a step 818 of reporting the determined one or more final candidate resources to a higher layer for selection of one or more transmission resources in the first sidelink communication. The higher layer can be MAC layer or RRC layer.

In this way, the first sidelink communication module acquires information related to the resource selection in the second sidelink communication module, and based on the acquired information, the first sidelink communication module adjusts the parameters for its own resource selection procedure for its candidate resource exclusion loop. In particular, as described above, when the first sidelink communication module determines that the threshold for resource exclusion in the first sidelink communication is smaller than the threshold for resource exclusion in the second sidelink communication, and also determines that the threshold for resource exclusion in the first sidelink communication needs to be relaxed, the first sidelink communication may assign a higher threshold for resource exclusion in the first sidelink communication, thereby ensuring sufficient amount of the candidate resources for transmissions at the UE, leading to an improved efficiency and quality in the communication.

The above-noted descriptions of FIG. 8 are directed to the embodiments in which a single UE (e.g., Type A device of FIG. 7) includes both the first communication module and the second communication module. However, the embodiments of the present disclosure are not so limited. In some embodiments, the method of FIG. 8 can be performed by two different UEs. For example, the first sidelink communication module (SL-1 module) is included in a first UE (e.g., Type B device of FIG. 7), and the second sidelink communication module (SL-2 module) is included in a second UE (e.g., Type A or Type C device of FIG. 7). In these embodiments, the first UE performs the method 800 and the second UE performs the method 820. In these embodiments, the first sidelink communication module and/or second sidelink communication module can be hardware, software, or a combination of hardware and software.

Figure 9:
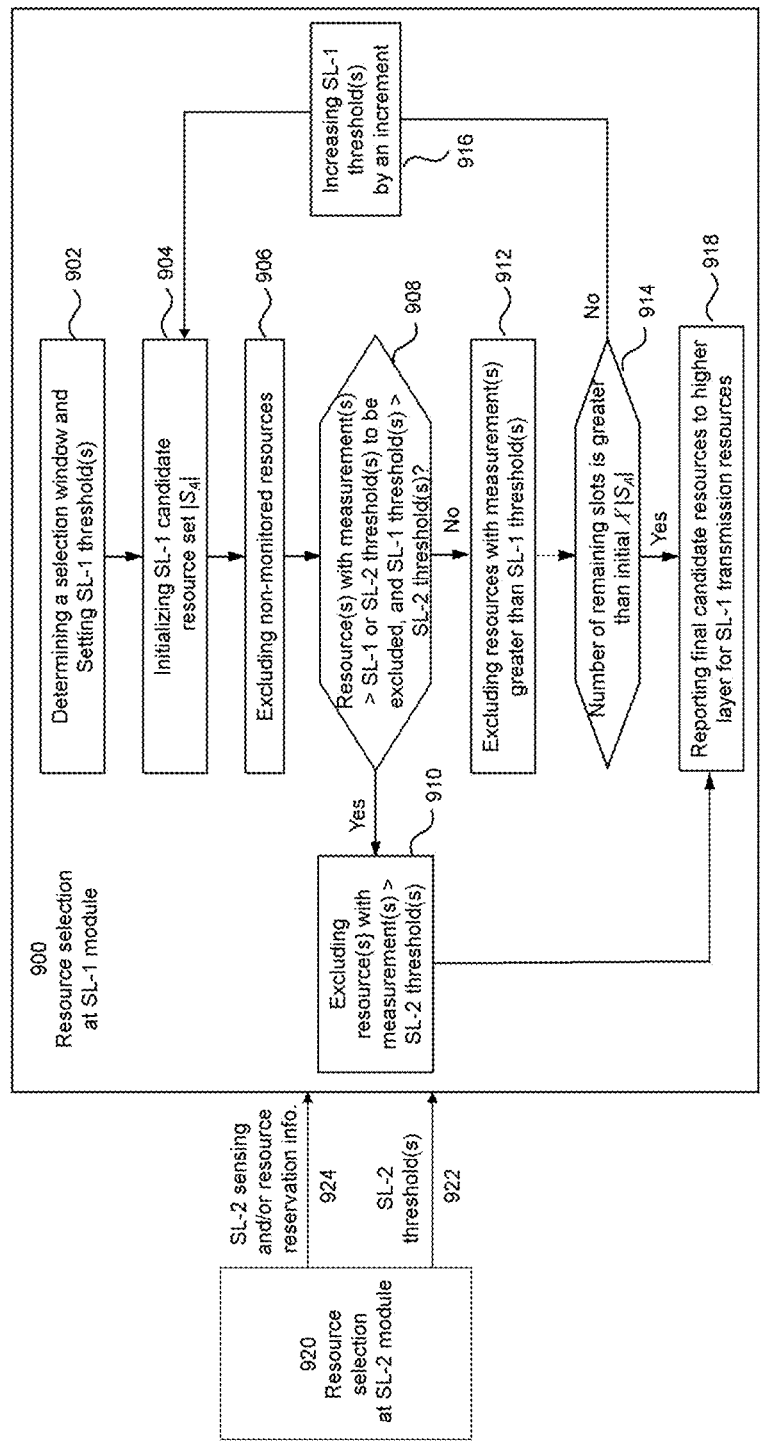
FIG. 9 is a schematic diagram illustrating a method for resource selection in a sidelink communication, consistent with some embodiments of the present disclosure.

FIG. 9 is a schematic diagram illustrating a method for resource selection in a sidelink communication, consistent with some embodiments of the present disclosure. As shown in FIG. 9, the method includes two processes (methods), i.e., a method 900 of resource selection at the first sidelink communication module (SL-1 module) and a method 920 of resource selection at a second sidelink communication module (SL-2 module). In an embodiment, the first sidelink communication is an NR sidelink communication and the second sidelink communication is an LTE sidelink communication.

In some embodiments, the method of FIG. 9 is performed by a single UE. The UE may be a Type A device, such as the Type A device in FIG. 7. The UE may include a first sidelink communication module and a second sidelink communication module. The first sidelink communication module may perform the method 900 and the second sidelink communication module may perform the method 920. In an embodiment, the first sidelink communication module and the second sidelink communication module of the UE may be two separate hardware compartments (components or devices) of the UE, each compartment having its own processor and/or memory. In this embodiment, in each compartment, a processor executes one or more computer instructions stored in a memory to perform the method 900 or 920. In another embodiment, the first sidelink communication module and the second sidelink communication module of the UE may be two separate memory devices storing corresponding computer instructions for the method 900 or 920. In another embodiment, the first sidelink communication module and the second sidelink communication module of the UE may be two distinct sets of computer instructions included in the same memory device or different memory devices. The method 920 performed by the second sidelink communication module is similar to the method 820 of FIG. 8. For the sake of brevity, detailed descriptions of the method 920 are omitted here. In method 900, the operations at the steps 902, 904, and 906 are similar to the operations at the steps 802, 804, and 806 of FIG. 8, respectively. For the sake of brevity, detailed descriptions of the steps 902, 904, and 906 of method 900 are omitted here.

Referring to FIG. 9, the method 900 includes a step 908 of determining whether to exclude one or more resources having a sensing measurement greater than the at least one first threshold parameter or the at least one second threshold parameter. In some embodiments, whether to use the at least one first threshold parameter or the at least one second threshold parameter for resource exclusion in the first sidelink communication is decided based on a configuration by a network (e.g., a base station) or a pre-configuration at the UE. In some embodiments, the step 908 may also include determining whether the at least one first threshold parameter is greater than the at least one second threshold parameter. In some embodiments, determining whether to exclude one or more resources having a sensing measurement greater than the at least one first threshold parameter or the at least one second threshold parameter includes determining that the at least one second threshold parameter is to be used for resource exclusion at the first sidelink communication module, and that the at least one first threshold parameter is greater than the at least one second threshold parameter.

In response to a determination that the at least one second threshold parameter is to be used for resource exclusion at the first sidelink communication module, and that the at least one first threshold parameter is greater than the at least one second threshold parameter, at a step 910, the first sidelink communication module may exclude one or more resources having a sensing measurement greater than the at least one second threshold parameter. The sensing measurement may include at least one of: one or more SL-RSRP values measured by the first sidelink communication module of the UE, one or more SL-RSSI values measured by the first sidelink communication module of the UE, one or more SL-RSRP values measured by the second sidelink communication module, or one or more SL-RSSI values measured by the second sidelink communication module. In some embodiments, the first sidelink communication module may exclude one or more resources having a sensing measurement greater than the at least one second threshold parameter and less than the at least one first threshold parameter. In some embodiments, the one or more excluded resources overlap with one or more resources reserved by one or more UEs in the second sidelink communication. In some embodiments, the one or more excluded resources correspond to one or more PSFCH transmissions that overlap with one or more resources reserved by one or more UEs in the second sidelink communication. In some embodiments, the one or more resources are excluded via physical layer of a first sidelink communication module of the UE. After the exclusion of the second sidelink communication resources, at a step 918, the remaining resources are reported to a higher layer to determine the final resources for transmission in the first sidelink communication. The higher layer can be MAC layer or RRC layer. On the other hand, at the step 908, in response to a determination that the at least one second threshold parameter is not to be used for resource exclusion at the first sidelink communication module, or that the at least one first threshold parameter is not greater than the at least one second threshold parameter, the method 900 proceeds with a step 912.

The method 900 includes the step 912 of excluding, from the candidate resource set, one or more resources having a sensing measurement greater than the at least one first threshold parameter.

The method 900 includes a step 914 of determining whether a number of remaining resources is equal to or greater than $X \cdot |S_A|$, where the X may be a value selected from $\{0.2, 0.35, 0.5\}$. In some embodiments, the value X can be any other value configured by a network (e.g., a base station) or preconfigured at the UE. If the first sidelink communication module determines that the number of candidate resources is not greater than $X \cdot |S_A|$ in the selection window, at a step 916, the first sidelink communication module increases the at least one first threshold parameter by an increment and the method iterates at step 904, until at least $X \cdot S_A$ of resources are obtained. The increment can be 3 dB or any other value(s). On the other hand, if the first sidelink communication module determines that the number of candidate resources is greater than $X \cdot |S_A|$ in the selection window, the method may proceed with a step 918 of reporting the determined one or more final candidate resources to a higher layer (e.g., MAC layer or RRC layer) for selection of one or more transmission resources in the first sidelink communication.

In this way, the first sidelink communication module acquires information about the resource selection procedure in the second sidelink communication module, and based on the acquired parameters, the first sidelink communication module adjusts the parameters for its own resource selection procedure for its candidate resource exclusion loop. In particular, when the first sidelink communication module uses a higher threshold than the second sidelink communication module, the first sidelink communication module may exclude resources which should have been excluded (i.e., deemed occupied by other UEs) from the second sidelink communication system point of view, thereby avoiding interferences and/or collisions in the first sidelink communication, leading to an improved efficiency and quality in the communication.

The above-noted descriptions of FIG. 9 are directed to the embodiments in which a single UE (e.g., Type A device of FIG. 7) includes both the first communication module and the second communication module. However, the embodiments of the present disclosure are not so limited. In some embodiments, the method of FIG. 9 can be performed by two different UEs. For example, a first UE (e.g., Type B device of FIG. 7) may include the first sidelink communication module and perform the method 900, and a second UE (e.g., Type A or Type C device of FIG. 7) may include the second sidelink communication module and perform the method 920. The first sidelink communication module and/or second sidelink communication module can be hardware, software, or a combination of hardware and software.

Figure 10:
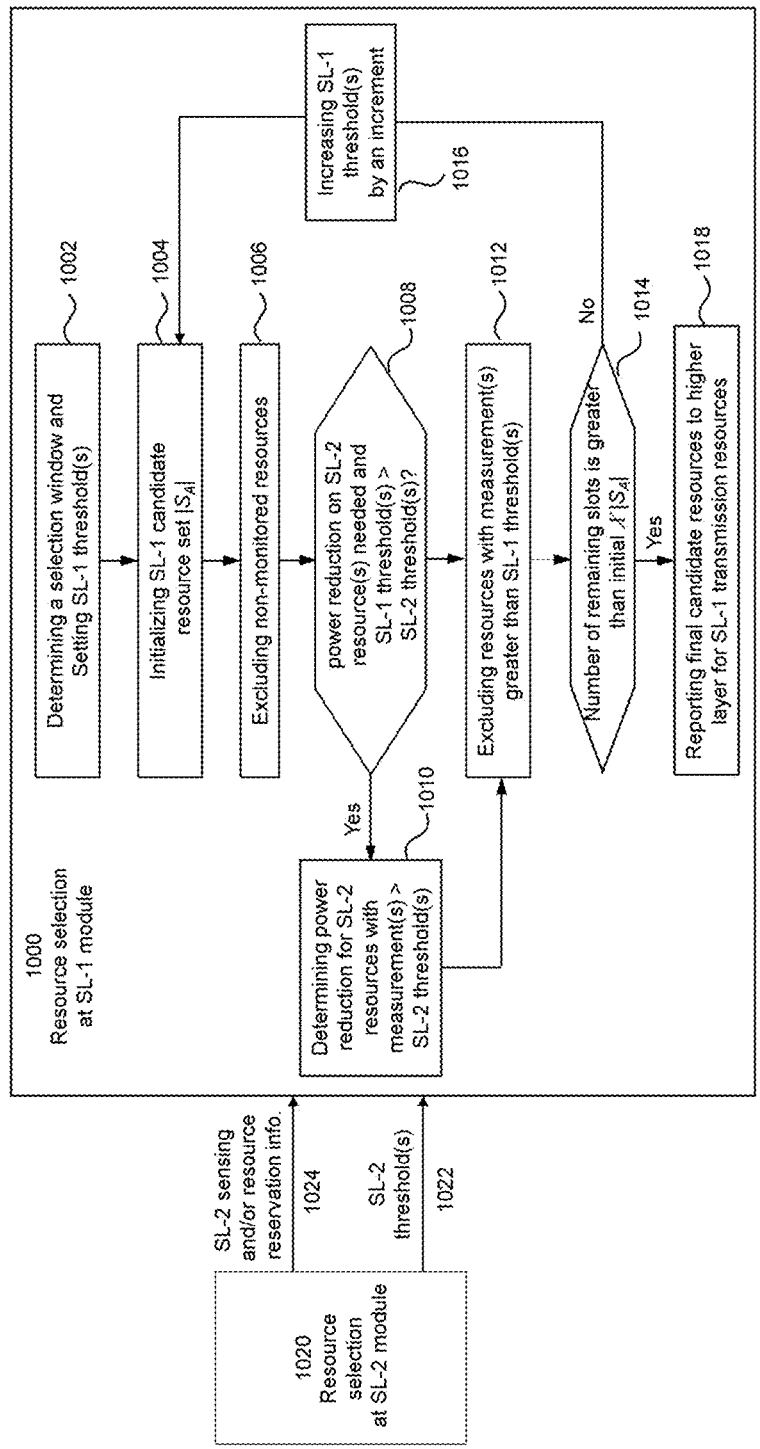
FIG. 10 is a schematic diagram illustrating a method for resource selection in a sidelink communication, consistent with some embodiments of the present disclosure.

FIG. 10 is a schematic diagram illustrating a method for resource selection in a sidelink communication, consistent with some embodiments of the present disclosure. As shown in FIG. 10, the method includes two processes (methods), i.e., a method 1000 of resource selection at the first sidelink communication module (SL-1 module) and a method 1020 of resource selection at a second sidelink communication module (SL-2 module). In an embodiment, the second sidelink communication is an LTE sidelink communication, and the first sidelink communication is an NR sidelink communication.

In some embodiments, the method of FIG. 10 is performed by a single UE. The UE may be a Type A device, such as the Type A device in FIG. 7. The UE may include a first sidelink communication module and a second sidelink communication module. The first sidelink communication module of the UE may perform the method 1000 and the second sidelink communication module of the UE may perform the method 1020. In an embodiment, the first sidelink communication module and the second sidelink communication module of the UE may be two separate hardware compartments (components or devices) of the UE, each compartment having its own processor and/or memory. In this embodiment, in each compartment, a processor executes one or more computer instructions stored in a memory to perform the method 1000 or 1020. In another embodiment, the first sidelink communication module and the second sidelink communication module of the UE may be two separate memory devices storing corresponding computer instructions for the method 1000 or 1020. In another embodiment, the first sidelink communication module and the second sidelink communication module of the UE may be two distinct sets of computer instructions included in the same memory device or different memory devices. The method 1020 performed by the second sidelink communication module is similar to the method 820 of FIG. 8. For the sake of brevity, detailed descriptions of the method 1020 are omitted here. In method 1000, the operations at the steps 1002, 1004, and 1006 are similar to the operations at the steps 802, 804, and 806 of FIG. 8, respectively. For the sake of brevity, detailed descriptions of the steps 1002, 1004, and 1006 of method 1000 are omitted here.

Referring to FIG. 10, the method 1000 includes a step 1008 of determining whether a power reduction needs to be performed on one or more resources associated with the second sidelink communication, and whether the at least one first threshold parameter is greater than the at least one second threshold parameter. In some embodiments, whether to perform the power reduction on the one or more resources associated with the second sidelink communication is decided based on a configuration by a network or preconfiguration at the UE.

If the first sidelink communication module determines that the power reduction needs to be performed on one or more resources associated with the second sidelink communication, and that the at least one first sidelink threshold parameter is greater than the at least one second threshold parameter, at a step 1010, the first sidelink communication module determines the power reduction for the one or more resources having sensing measurement greater than the at least one second sidelink threshold parameter. After the power reduction, at a step 1012, the first sidelink communication module excludes one or more resources having a sensing measurement in the first sidelink communication greater than the at least one first sidelink threshold parameter.

On the other hand, at the step 1008, if the first sidelink communication module determines that the power reduction does not need to be performed on one or more resources associated with the second sidelink communication, or that the at least one first threshold parameter is not greater than the at least one second threshold parameter, at a step 1012, the first sidelink communication module excludes one or more resources having a sensing measurement greater than the at least one first sidelink threshold parameter.

The method 1000 includes a step 1014 of determining whether a number of remaining resources is equal to or greater than $X \cdot |S_A|$, where the X is a value selected from $\{0.2, 0.35, 0.5\}$. In some embodiments, the value X may be any other value configured by a network or preconfigured at the UE. If the first sidelink communication module determines that the number of candidate resources is not greater than $X \cdot |S_A|$ in the selection window, at a step 1016, the first sidelink communication module increases the at least one first threshold parameter by an increment and the method iterates at step 1004, until at least $X \cdot |S_A|$ of resources are obtained. The increment can be 3 dB or any other value(s). On the other hand, if the first sidelink communication module determines that the number of candidate resources is greater than $X \cdot |S_A|$ in the selection window, the method may proceed with a step 1018 of reporting the determined one or more final candidate resources to a higher layer (e.g., MAC layer or RRC layer) for selection of one or more transmission resources in the first sidelink communication.

In this way, the first sidelink communication module acquires information about the resource selection in the second sidelink communication module, and based on the acquired information, the first sidelink communication module adjusts the parameters for its own resource selection procedure for its candidate resource exclusion loop. In particular, when the first sidelink communication module uses a higher threshold than second sidelink communication module, the first sidelink communication module may perform power reduction on one or more second sidelink communication resources which should have been excluded (i.e., deemed occupied by other UEs) from the second sidelink communication system point of view, thereby reducing interference to the second sidelink communication.

The above-noted descriptions of FIG. 10 are directed to the embodiments in which a single UE (e.g., Type A device of FIG. 7) includes both the first communication module and the second communication module. However, the embodiments of the present disclosure are not so limited. In some embodiments, the method of FIG. 10 can be performed by two different UEs. For example, a first UE (e.g., Type B device of FIG. 7) may include the first sidelink communication module and perform the method 1000, and a second UE (e.g., Type A or Type C device of FIG. 7) may include the second sidelink communication module and perform the method 1020. The first sidelink communication module and/or second sidelink communication module can be hardware, software, or a combination of hardware and software.

At least some embodiments of the present disclosure are directed to combinations of the methods described with respect to FIGS. 8-10. For example, in an embodiment, the method of FIG. 8 and the method of FIG. 9 are combined to form a new method in which the first sidelink communication module may relax the at least one first threshold parameter first, and then exclude one or more resources that should have been excluded (i.e., deemed occupied by other UEs) from the second sidelink communication system point of view. For example, in another embodiment, the method of FIG. 8, the method of FIG. 9, and the method 10 are combined to form a new method.

The methods described in this disclosure can be applied to any sidelink communications, for example, long term evolution (LTE) or new radio (NR) or a future generation ($6^{th}$ generation (6G), $7^{th}$ generation (7G), or any future generation) sidelink communications. The methods described in this disclosure can also be applied to downlink/uplink communications between a base station and a UE. The methods described in this disclosure can also be applied to other systems, for example, the systems that comply with other standards (e.g., the Institute of Electrical and Electronics Engineers (IEEE) standards).

Figure 11:
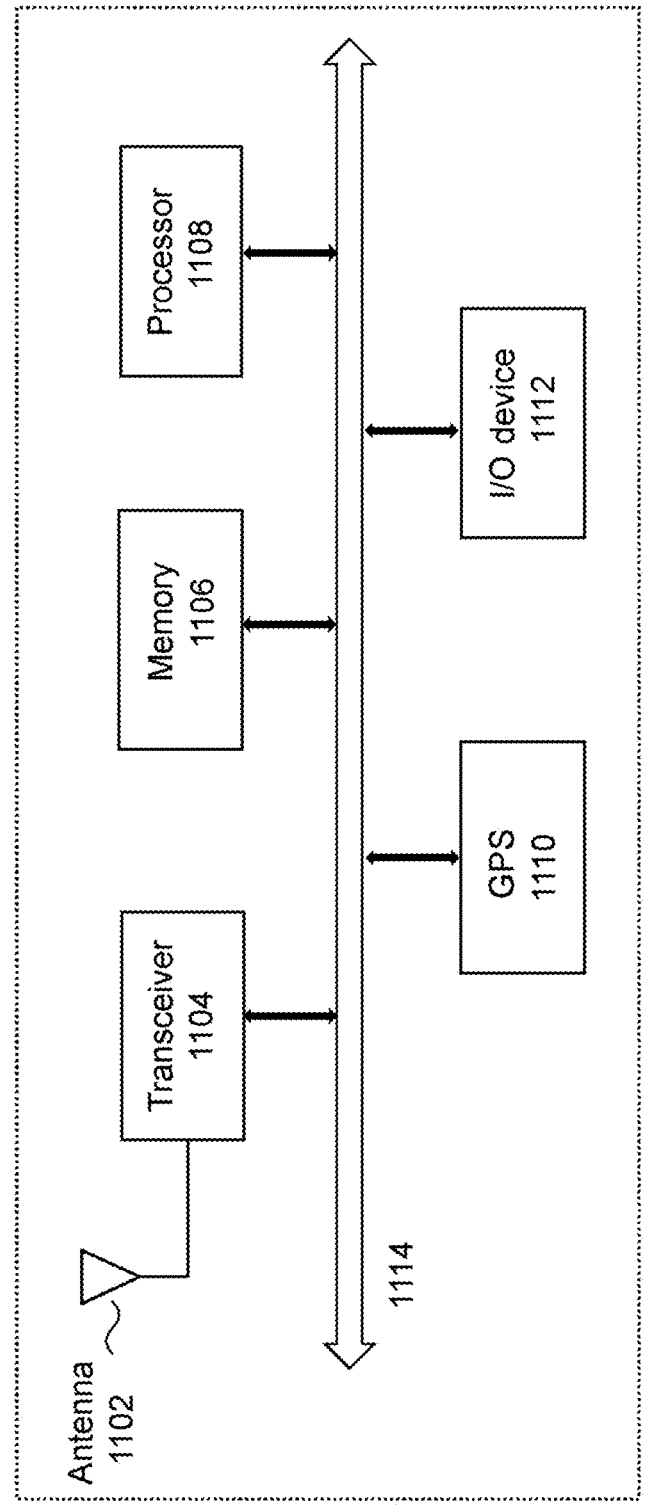
FIG. 11 is a block diagram of a UE, consistent with some embodiments of the present disclosure.

FIG. 11 is a block diagram of a UE 1100, consistent with some embodiments of the present disclosure. For example, the UE 1100 may be Type A device of FIG. 7 and performs the method of FIG. 8, or the method of FIG. 9, or the method of FIG. 10, or any combinations of the methods in FIGS. 8-10. For another example, the UE 1100 may be Type B device of FIG. 7, and in corporation with a Type A or Type C device, performs the method of FIG. 8, or the method of FIG. 9, or the method of FIG. 10, or any combinations of the methods in FIGS. 8-10. For another example, the UE 1100 may be Type C device of FIG. 7, and in corporation with a Type A or Type B device, performs the method of FIG. 8, or the method of FIG. 9, or the method of FIG. 10, or any combinations of the methods in FIGS. 8-10. The UE 1100 may be mounted in a moving vehicle or in a fixed position. UE 1100 may take any form, including but not limited to, a vehicle, a component mounted in a vehicle, a road-side unit, a laptop computer, a wireless terminal including a mobile phone, a wireless handheld device, or wireless personal device, or any other form.

Referring to FIG. 11, the UE 1100 may include antenna 1102 that may be used for transmission or reception of electromagnetic signals to/from a base station or other UEs. The Antenna 1102 may include one or more antenna elements and may enable different input-output antenna configurations, for example, multiple input multiple output (MIMO) configuration, multiple input single output (MISO) configuration, and single input multiple output (SIMO) configuration. In some embodiments, the antenna 1102 may include multiple (e.g., tens or hundreds) antenna elements and may enable multi-antenna functions such as beamforming. In some embodiments, the antenna 1102 is a single antenna.

The UE 1100 may include a transceiver 1104 that is coupled to the antenna 1102. The transceiver 1104 may be a wireless transceiver at the UE 1100 and may communicate bi-directionally with a base station or other UEs. For example, the transceiver 1104 may receive/transmit wireless signals from/to a base station via downlink/uplink communication. The transceiver 1104 may also receive/transmit wireless signals from/to another UE or road side unit via sidelink communication. The transceiver 1104 may include a modem to modulate the packets and provide the modulated packets to the antenna 1102 for transmission, and to demodulate packets received from the antenna 1102.

The UE 1100 may include a memory 1106. The memory 1106 may be any type of computer-readable storage medium including volatile or non-volatile memory devices, or a combination thereof. The computer-readable storage medium includes, but is not limited to, non-transitory computer storage media. A non-transitory storage medium may be accessed by a general purpose or special purpose computer. Examples of non-transitory storage medium include, but are not limited to, a portable computer diskette, a hard disk, random access memory (RAM), read-only memory (ROM), an erasable programmable read-only memory (EPROM), electrically erasable programmable ROM (EEPROM), a digital versatile disk (DVD), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable medium.

The memory 1106 may store information related to identities of UE 1100 and the signals and/or data received by antenna 1102. The memory 1106 may also store post-processing signals and/or data. The memory 1106 may also store computer-readable program instructions, mathematical models, and algorithms that are used in signal processing in receiver 1104 and computations in processor 1108. The memory 1106 may further store computer-readable program instructions for execution by processor 1108 to operate UE 1100 to perform various functions described in this disclosure. In some examples, the memory 1106 may include a basic input/output system (BIOS) which may control basic hardware or software operation such as the interaction with peripheral components or devices. In some embodiments, the memory 1106 includes both LTE SL and NR SL modules. In some embodiments, the memory 1106 includes an NR SL module only. In some embodiments, the memory 1106 includes an LTE SL module only.

The computer-readable program instructions of the present disclosure may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The UE 1100 may include a processor 1108 that may include a hardware device with processing capabilities. The processor 1108 may include at least one of a general-purpose processor, a digital signal processor (DSP), a central processing unit (CPU), a microcontroller, an application specific integrated circuit (ASIC), a field programmable gate array (FPGA), a programmable logic device, a discrete gate or transistor logic component, a discrete hardware component, or other programmable logic device. Examples of the general-purpose processor include, but are not limited to, a microprocessor, any conventional processor, a controller, a microcontroller, or a state machine. In some embodiments, the processor 1108 may be implemented using a combination of devices (e.g., a combination of a DSP and a microprocessor, multiple microprocessors, one or more microprocessors in conjunction with a DSP core, or any other such configuration). The processor 1108 may receive, from transceiver 1104, downlink signals or sidelink signals and further process the signals. The processor 1108 may also receive, from transceiver 1104, data packets and further process the packets. In some embodiments, the processor 1108 may be configured to operate a memory using a memory controller. In some embodiments, a memory controller may be integrated into the processor 1108. The processor 1108 may be configured to execute computer-readable instructions stored in a memory (e.g., the memory 1106) to cause the UE 1100 to perform various functions.

The UE 1100 may include a global positioning system (GPS) 1110. The GPS 1110 may be used for enabling location-based services or other services based on a geographical position of the UE 1100 and/or synchronization among UEs. The GPS 1110 may receive global navigation satellite systems (GNSS) signals from a single satellite or a plurality of satellite signals via the antenna 1102 and provide a geographical position of the UE 1100 (e.g., coordinates of the UE 1100). In some embodiments, the GPS 1110 is omitted. In some embodiments, a timer is included.

The UE 1100 may include an input/output (I/O) device 1112 that may be used to communicate a result of signal processing and computation to a user or another device. The I/O device 1112 may include a user interface including a display and an input device to transmit a user command to processor 1108. The display may be configured to display a status of signal reception at the UE 1100, the data stored at memory 1106, a status of signal processing, and a result of computation, etc. The display may include, but is not limited to, a cathode ray tube (CRT), a liquid crystal display (LCD), a light-emitting diode (LED), a gas plasma display, a touch screen, or other image projection devices for displaying information to a user. The input device may be any type of computer hardware equipment used to receive data and control signals from a user. The input device may include, but is not limited to, a keyboard, a mouse, a scanner, a digital camera, a joystick, a trackball, cursor direction keys, a touchscreen monitor, or audio/video commanders, etc.

The UE 1100 may further include a machine interface 1114, such as an electrical bus that connects the transceiver 1104, the memory 1106, the processor 1108, the GPS 1110, and the I/O device 1112.

In some embodiments, the UE 1100 may be a Type A device and includes both a first sidelink communication module and a second sidelink communication module. The first sidelink communication module and/or the second sidelink communication module may be hardware, software, or a combination of hardware or software. The processor 1108 may be configured or programmed to execute the instructions stored in the memory 1106 to determine a selection window and set at least one first threshold parameter for a resource exclusion at the UE; initialize a candidate resource set including one or more resources in a first sidelink communication; receive, from a second sidelink communication module, at least one of: at least one second threshold parameter used for a resource exclusion at the second sidelink communication module, sidelink sensing information obtained by the second sidelink communication module, or resource reservation information collected by the second sidelink communication module; determine one or more final candidate resources in the first sidelink communication using the at least one first threshold parameter and the at least one information received from the second sidelink communication module; and report the determined one or more final candidate resources to a higher layer for selection of one or more transmission resources in the first sidelink communication.

In some embodiments, determining the one or more final candidate resources in the first sidelink communication may include determining that the at least one first threshold parameter is to be relaxed with respect to the second sidelink communication, and that the at least one first threshold parameter is smaller than the at least one second threshold parameter; in response to the determining, assigning the at least one first threshold parameter to be equal to the at least one second threshold parameter; and excluding, from the candidate resource set, one or more resources having a sensing measurement greater than the assigned at least one second threshold parameter.

In some embodiments, determining the one or more final candidate resources in the first sidelink communication may include determining to exclude, from the candidate resource set, one or more resources having a sensing measurement greater than at least one of the at least one first threshold parameter or the at least one second threshold parameter. In some embodiments, determining whether to exclude one or more resources having a sensing measurement greater than the at least one first threshold parameter or the at least one second threshold parameter includes determining whether the at least one second threshold parameter is to be used for the resource exclusion at the first sidelink communication module, and whether the at least one first threshold parameter is greater than the at least one second threshold parameter. The determining the one or more final candidate resources may also include in response to a determination that the at least one second threshold parameter is to be used for the resource exclusion at the first sidelink communication module, and that the at least one first threshold parameter is greater than the at least one second threshold parameter, excluding, from the candidate resource set, one or more resources having a sensing measurement greater than the at least one second threshold parameter and less than the at least one first threshold parameter.

In some embodiments, determining the one or more final candidate resources in the first sidelink communication may include determining that a power reduction on one or more resources associated with the second sidelink communication is to be performed and that the at least one first threshold parameter is greater than the at least one second threshold parameter; determining power reduction on the one or more resources having a sensing measurement in the second sidelink communication greater than the at least one second threshold parameter; and excluding, from the candidate resource set, one or more resources having a sensing measurement in the first sidelink communication greater than the at least one first threshold parameter.

In some embodiments, the UE 1100 may be a Type C device in a sidelink communication and includes a second sidelink communication module only. The second sidelink communication module may be hardware, software, or a combination of hardware or software. The processor 1108 may be configured or programmed to execute the instructions stored in the memory 1106 to collect sidelink sensing information and resource reservation information for one or more reserved resources in the second sidelink communication; determine one or more candidate resources based on the sidelink sensing information for the one or more reserved resources in the second sidelink communication by performing a resource exclusion on the one or more candidate resources based on at least one threshold parameter; select one or more resources among the one or more candidate resources; and transmit, to a first UE in a first sidelink communication, at least one of: the at least one threshold parameter used for the resource exclusion at the second UE, the sidelink sensing information, or the resource reservation information.

As used in this disclosure, use of the term "or" in a list of items indicates an inclusive list. The list of items may be prefaced by a phrase such as "at least one of" or "one or more of." For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification, the terms "comprise," "include," or "contain" may be used interchangeably and have the same meaning and are to be construed as inclusive and open-ended. The terms "comprise," "include," or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives, and variations in the details, materials, and arrangements of the parts which have been described and illustrated in order to explain the nature of described embodiments may be made by those skilled in the art without departing from the scope. Accordingly, the following claims embrace all such alternatives, modifications, and variations that fall within the terms of the claims.

Clause 1: A user equipment (UE) including a first sidelink communication module for resource selection in a first sidelink communication, the UE comprising:
  a memory storing an instruction; and
  a processor configured to execute the instruction stored in the memory to:
    determine a selection window and set at least one first threshold parameter for a resource exclusion at the UE;
    initialize a candidate resource set including one or more resources in the first sidelink communication;
    receive, from a second sidelink communication module, at least one of: at least one second threshold parameter used for a resource exclusion at the second sidelink communication module, sidelink sensing information obtained by the second sidelink communication module, or resource reservation information collected by the second sidelink communication module;
    determine one or more final candidate resources in the first sidelink communication using the at least one first threshold parameter and the at least one information received from the second sidelink communication module; and report the determined one or more final candidate resources to a higher layer for selection of one or more transmission resources in the first sidelink communication.

Clause 2: The UE of clause 1, wherein the at least one first threshold parameter is included in at least one of:
  a list of initial threshold parameters for resource exclusion of one or more resources reserved by one or more other UEs in the first sidelink communication, or
  a list of initial threshold parameters for resource exclusion of one or more resources reserved by one or more other UEs in the second sidelink communication.

Clause 3: The UE of clause 1, wherein the at least one second threshold parameter comprises at least one of:
  a sidelink reference signal received power (SL-RSRP) threshold applied for the resource exclusion at the second sidelink communication module, or a sidelink received signal strength indicator (SL-RSSI) threshold applied for the resource exclusion at the second sidelink communication module.

Clause 4: The UE of clause 1, wherein in determining the one or more final candidate resources, the processor is further configured to execute the instruction stored in the memory to:
  determine that the at least one first threshold parameter is to be relaxed with respect to a second sidelink communication, and that the at least one first threshold parameter is smaller than the at least one second threshold parameter;
  assign the at least one first threshold parameter to be equal to the at least one second threshold parameter; and
  exclude, from the candidate resource set, one or more resources having a sensing measurement greater than the assigned at least one first threshold parameter.

Clause 5: The UE of clause 4, wherein the sensing measurement comprises at least one of:
  one or more SL-RSRP values measured by the first sidelink communication module of the UE,
  one or more SL-RSSI values measured by the first sidelink communication module of the UE,
  one or more SL-RSRP values measured by the second sidelink communication module, or
  one or more SL-RSSI values measured by the second sidelink communication module.

Clause 6: The UE of clause 4, wherein the processor is further configured to execute the instruction stored in the memory to:
  determine whether a number of remaining resources is equal to or greater than X % of a total number of resources in the candidate resource set, where X is a value selected from {20, 35, 50}; and
  in response to a determination that the number of the remaining resources is equal to or greater than the X % of the total number of the resources in the candidate resource set, set the remaining resources as the final candidate resources.

Clause 7: The UE of clause 6, wherein the processor is further configured to execute the instruction stored in the memory to:

in response to a determination that the number of the remaining resources is smaller than the X % of the total number of the resources in the candidate resource set, increase the at least one first threshold parameter by an increment until at least the X % resources are obtained.

Clause 8: The UE of clause 1, wherein in determining the one or more final candidate resources, the processor is further configured to execute the instruction stored in the memory to:

exclude, from the candidate resource set, one or more resources having a sensing measurement greater than at least one of:

the at least one first threshold parameter, or the at least one second threshold parameter.

Clause 9: The UE of clause 8, wherein the processor is further configured to execute the instruction stored in the memory to:

determine that the at least one second threshold parameter is to be used for the resource exclusion at the first sidelink communication module, and that the at least one first threshold parameter is greater than the at least one second threshold parameter; and exclude, from the candidate resource set, one or more resources having a sensing measurement greater than the at least one second threshold parameter and less than the at least one first threshold parameter.

Clause 10: The UE of clause 8, wherein the sensing measurement comprises at least one of:

one or more SL-RSRP values measured by the first sidelink communication module of the UE, one or more SL-RSSI values measured by the first sidelink communication module of the UE, one or more SL-RSRP values measured by the second sidelink communication module, or one or more SL-RSSI values measured by the second sidelink communication module.

Clause 11: The UE of clause 8, wherein the one or more excluded resources overlap with one or more resources reserved by one or more other UEs in a second sidelink communication.

Clause 12: The UE of clause 8, wherein the one or more excluded resources correspond to one or more physical sidelink feedback channel (PSFCH) transmissions that overlap with one or more resources reserved by one or more other UEs in a second sidelink communication.

Clause 13: The UE of clause 8, wherein the one or more resources are excluded via physical layer of a first sidelink communication module of the UE.

Clause 14: The UE of clause 1, wherein the at least one first threshold parameter is determined based on at least one of: (1) one or more priorities of one or more other UEs in a second sidelink communication, or (2) one or more priorities associated with one or more transmissions in the first sidelink communication.

Clause 15: The UE of clause 1, wherein in determining the one or more final candidate resources, the processor is further configured to execute the instruction stored in the memory to:

determine that a power reduction on one or more resources associated with a second sidelink communication is to be performed and that the at least one first threshold parameter is greater than the at least one second threshold parameter;

determine power reduction on the one or more resources having a sensing measurement in the second sidelink communication greater than the at least one second threshold parameter; and exclude, from the candidate resource set, one or more resources having a sensing measurement in the first sidelink communication greater than the at least one first threshold parameter.

Clause 16: The UE of clause 15, wherein the processor is further configured to execute the instruction stored in the memory to:

determine whether a number of remaining resources is equal to or greater than X % of a total number of resources in the candidate resource set, where X is a value selected from {20, 35, 50}; and in response to a determination that the number of the remaining resources is equal to or greater than the X % of the total number of the resources in the candidate resource set, set the remaining resources as the final candidate resources.

Clause 17: The UE of clause 16, wherein the processor is further configured to execute the instruction stored in the memory to:

in response to a determination that the number of the remaining resources is smaller than the X % of the total number of the resources in the candidate resource set, increase the at least one first threshold parameter by an increment until at least the X % resources are obtained.

Clause 18: The UE of clause 1, wherein the at least one first threshold parameter is included in a list of initial first threshold parameters that are configured by a network or pre-configured at the UE.

Clause 19: The UE of clause 1, wherein the processor is further configured to execute the instruction stored in the memory to:

exclude one or more non-monitored resources associated with the first sidelink communication from the candidate resource set.

Clause 20: The UE of clause 1, wherein the sidelink sensing information received from the second sidelink communication module comprises at least one of:

one or more SL-RSRP measurement results associated with one or more reserved resources in a second sidelink communication, one or more SL-RSSI measurement results associated with the one or more reserved resources in the second sidelink communication, one or more times associated with one or more reserved transmissions in the second sidelink communication, one or more frequencies associated with the one or more reserved transmissions in the second sidelink communication, one or more resource reservation periods associated with the one or more reserved resources in the second sidelink communication, one or more priorities associated with the one or more reserved resources in the second sidelink communication, or information of one or more non-monitored resources in the second sidelink communication.

Clause 21: The UE of clause 1, wherein the first sidelink communication is a new radio (NR) sidelink communication, a second sidelink communication is a long-term evolution (LTE) sidelink communication, and the UE includes both an LTE sidelink module and an NR sidelink module.

Clause 22: The UE of clause 1, wherein the first sidelink communication is an NR sidelink communication, a second sidelink communication is an LTE sidelink communication, the UE includes an NR sidelink module, and another UE in the LTE sidelink communication includes an LTE sidelink module.

Clause 23: The UE of clause 1, wherein the sidelink sensing information and the resource reservation information are used by a first sidelink communication module of the UE to derive the at least one second threshold parameter.

Clause 24: The UE of clause 1, wherein the second sidelink communication module is part of the UE.

Clause 25: The UE of clause 1, wherein the second sidelink communication module is included in another UE in a second sidelink communication.

Clause 26: A second user equipment (UE) for resource selection in a second sidelink communication, the second UE comprising:
   a memory storing an instruction; and
   a processor configured to execute the instruction stored in the memory to:
      collect sidelink sensing information and resource reservation information for one or more reserved resources in the second sidelink communication;
      determine one or more candidate resources based on the sidelink sensing information for the one or more reserved resources in the second sidelink communication by performing a resource exclusion on the one or more candidate resources based on at least one threshold parameter;
      select one or more resources among the one or more candidate resources; and
      transmit, to a first UE in a first sidelink communication, at least one of: the at least one threshold parameter used for the resource exclusion at the second UE, the sidelink sensing information, or the resource reservation information.

Clause 27: The second UE of clause 26, wherein the sidelink sensing information for the one or more reserved resources in the second sidelink communication comprises at least one of:
   one or more sidelink reference signal received power (SL-RSRP) measurement results associated with the one or more reserved resources,
   one or more sidelink received signal strength indicator (SL-RSSI) measurement results associated with the one or more reserved resources,
   one or more times associated with one or more reserved transmissions in the second sidelink communication,
   one or more frequencies associated with the one or more reserved transmissions in the second sidelink communication,
   one or more resource reservation periods associated with the one or more reserved resources,
   one or more priorities associated with the one or more reserved resources, or information of one or more non-monitored resources in the second sidelink communication.

Clause 28: The second UE of clause 26, wherein the at least one threshold parameter used in the resource exclusion comprises at least one of:
   an SL-RSRP threshold applied for the resource exclusion, or
   an SL-RSSI threshold applied for the resource exclusion.

Clause 29: The second UE of clause 28, wherein the SL-RSRP threshold and the SL-RSSI threshold are configured by a network or preconfigured at the second UE.

Clause 30: The second UE of clause 26, wherein the second sidelink communication is a long-term evolution (LTE) sidelink communication, and the first sidelink communication is a new radio (NR) sidelink communication.

Clause 31: The second UE of clause 26, wherein in collecting the sidelink sensing information, the processor is further configured to execute the instruction to:
   perform a channel sensing in the second sidelink communication; and
   measure at least one of: one or more SL-RSRP values, or one or more SL-RSSI values for the one or more reserved resources.

Clause 32: A method for resource selection for a user equipment (UE) in a first sidelink communication, the UE comprising a first sidelink communication module, the method comprising:
   determining, by the first sidelink communication module, a selection window;
   setting, by the first sidelink communication module, at least one first threshold parameter for a resource exclusion at the first sidelink communication module;
   initializing, by the first sidelink communication module, a candidate resource set including one or more resources in a first sidelink communication;
   receiving, from a second sidelink communication module, at least one of: at least one second threshold parameter used for a resource exclusion at the second sidelink communication module, sidelink sensing information obtained by the second sidelink communication module, or resource reservation information collected by the second sidelink communication module;
   determining, by the first sidelink communication module, one or more final candidate resources in the first sidelink communication using the at least one first threshold parameter and the at least one information received from the second sidelink communication module; and
   reporting, by the first sidelink communication module, the determined one or more final candidate resources to a higher layer for selection of one or more transmission resources in the first sidelink communication.

Clause 33: The method of clause 32, wherein the at least one first threshold parameter is included in at least one of:
   a list of initial threshold parameters for resource exclusion of one or more resources reserved by one or more other UEs in the first sidelink communication, or
   a list of initial threshold parameters for resource exclusion of one or more resources reserved by one or more other UEs in the second sidelink communication.

Clause 34: The method of clause 32, wherein the at least one second threshold parameter comprises at least one of:
   a sidelink reference signal received power (SL-RSRP) threshold applied for the resource exclusion at the second sidelink communication module, or
   a sidelink received signal strength indicator (SL-RSSI) threshold applied for the resource exclusion at the second sidelink communication module.

Clause 35: The method of clause 32, wherein determining the one or more final candidate resources further comprises:
   determining that the at least one first threshold parameter is to be relaxed with respect to a second sidelink communication, and that the at least one first threshold parameter is smaller than the at least one second threshold parameter;
   assigning the at least one first threshold parameter to be equal to the at least one second threshold parameter; and excluding, from the candidate resource set, one or more resources having a sensing measurement greater than the assigned at least one first threshold parameter.

Clause 36: The method of clause 35, wherein the sensing measurement comprises at least one of:
one or more SL-RSRP values measured by the first sidelink communication module of the UE,
one or more SL-RSSI values measured by the first sidelink communication module of the UE,
one or more SL-RSRP values measured by the second sidelink communication module, or
one or more SL-RSSI values measured by the second sidelink communication module.

Clause 37: The method of clause 35, further comprising:
determining whether a number of remaining resources is equal to or greater than X % of a total number of resources in the candidate resource set, where X is a value selected from {20, 35, 50}; and
in response to a determination that the number of the remaining resources is equal to or greater than the X % of the total number of the resources in the candidate resource set, setting the remaining resources as the final candidate resources.

Clause 38: The method of clause 37, further comprising:
in response to a determination that the number of the remaining resources is smaller than the X % of the total number of the resources in the candidate resource set, increasing the at least one first threshold parameter by an increment until at least the X % resources are obtained.

Clause 39: The method of clause 32, wherein determining the one or more final candidate resources further comprises:
determining to exclude from the candidate resource set, one or more resources having a sensing measurement greater than at least one of:
the at least one first threshold parameter, or
the at least one second threshold parameter.

Clause 40: The method of clause 39, wherein determining the one or more final candidate resources further comprises:
determining that the at least one second threshold parameter is to be used for the resource exclusion at the second sidelink communication module, and that the at least one first threshold parameter is greater than the at least one second threshold parameter; and
excluding, from the candidate resource set, one or more resources having a sensing measurement greater than the at least one second threshold parameter and less than the at least one first threshold parameter.

Clause 41: The method of clause 39, wherein the sensing measurement comprises at least one of:
one or more SL-RSRP values measured by the first sidelink communication module of the UE,
one or more SL-RSSI values measured by the first sidelink communication module of the UE,
one or more SL-RSRP values measured by the second sidelink communication module, or
one or more SL-RSSI values measured by the second sidelink communication module.

Clause 42: The method of clause 39, wherein the one or more excluded resources overlap with one or more resources reserved by one or more other UEs in a second sidelink communication.

Clause 43: The method of clause 39, wherein the one or more excluded resources correspond to one or more physical sidelink feedback channel (PSFCH) transmissions that overlap with one or more resources reserved by one or more other UEs in a second sidelink communication.

Clause 44: The method of clause 39, wherein the one or more resources are excluded via physical layer of a first sidelink communication module of the UE.

Clause 45: The method of clause 32, wherein the at least one first threshold parameter is determined based on at least one of: (1) one or more priorities of one or more other UEs in a second sidelink communication, or (2) one or more priorities associated with one or more transmissions in the first sidelink communication.

Clause 46: The method of clause 32, wherein determining the one or more final candidate resources further comprises:
determining that a power reduction on one or more resources associated with a second sidelink communication is to be performed and that the at least one first threshold parameter is greater than the at least one second threshold parameter;
determining power reduction on the one or more resources having a sensing measurement in the second sidelink communication greater than the at least one second threshold parameter; and
excluding, from the candidate resource set, one or more resources having a sensing measurement in the first sidelink communication greater than the at least one first threshold parameter.

Clause 47: The method of clause 46, further comprising:
determining whether a number of remaining resources is equal to or greater than X % of a total number of resources in the candidate resource set, where X is a value selected from {20, 35, 50}; and
in response to a determination that the number of the remaining resources is equal to or greater than the X % of the total number of the resources in the candidate resource set, setting the remaining resources as the final candidate resources.

Clause 48: The method of clause 47, further comprising:
in response to a determination that the number of the remaining resources is smaller than the X % of the total number of the resources in the candidate resource set, increasing the at least one first threshold parameter by an increment until at least the X % resources are obtained.

Clause 49: The method of clause 32, wherein the at least one first threshold parameter is included in a list of initial first threshold parameters that are configured by a network or pre-configured at the UE.

Clause 50: The method of clause 32, further comprising:
excluding one or more non-monitored resources associated with the first sidelink communication from the candidate resource set.

Clause 51: The method of clause 32, wherein the sidelink sensing information received from the second sidelink communication module comprises at least one of:
one or more SL-RSRP measurement results associated with one or more reserved resources in a second sidelink communication,
one or more SL-RSSI measurement results associated with the one or more reserved resources in the second sidelink communication,
one or more times associated with one or more reserved transmissions in the second sidelink communication,
one or more frequencies associated with the one or more reserved transmissions in the second sidelink communication,
one or more resource reservation periods associated with the one or more reserved resources in the second sidelink communication, one or more priorities associated with the one or more reserved resources in the second sidelink communication, or information of one or more non-monitored resources in the second sidelink communication.

Clause 52: The method of clause 32, wherein the first sidelink communication is a new radio (NR) sidelink communication, a second sidelink communication is a long-term evolution (LTE) sidelink communication, the UE includes both an NR sidelink module and an LTE sidelink module.

Clause 53: The method of clause 32, wherein the first sidelink communication is an NR sidelink communication, a second sidelink communication is an LTE sidelink communication, the UE includes an NR sidelink module, and another UE in the LTE sidelink communication includes an LTE sidelink module.

Clause 54: The method of clause 32, wherein the sidelink sensing information and the resource reservation information are used by a first sidelink communication module of the UE to derive the at least one second threshold parameter.

Clause 55: The method of clause 32, wherein the second sidelink communication module is part of the UE.

Clause 56: The method of clause 32, wherein the second sidelink communication module is included in another UE in a second sidelink communication.

Clause 57: A method for resource selection in a second sidelink communication, the method comprising:
collecting, by a second user equipment (UE) in the second sidelink communication, sidelink sensing information and resource reservation information for one or more reserved resources in the second sidelink communication;
determining, by the second UE, one or more candidate resources based on the sidelink sensing information for the one or more reserved resources in the second sidelink communication by performing a resource exclusion on the one or more candidate resources based on at least one threshold parameter;
selecting, by the second UE, one or more resources among the one or more candidate resources; and
transmitting, to a first UE in a first sidelink communication, at least one of: the at least one threshold parameter used for the resource exclusion at the second UE, the sidelink sensing information, or the resource reservation information.

Clause 58: The method of clause 57, wherein the sidelink sensing information for the one or more reserved resources in the second sidelink communication comprises at least one of:
one or more sidelink reference signal received power (SL-RSRP) measurement results associated with the one or more reserved resources,
one or more sidelink received signal strength indicator (SL-RSSI) measurement results associated with the one or more reserved resources,
one or more times associated with one or more reserved transmissions in the second sidelink communication,
one or more frequencies associated with the one or more reserved transmissions in the second sidelink communication,
one or more resource reservation periods associated with the one or more reserved resources,
one or more priorities associated with the one or more reserved resources, or
information of one or more non-monitored resources in the second sidelink communication.

Clause 59: The method of clause 57, wherein the at least one threshold parameter used in the resource exclusion comprises at least one of:
an SL-RSRP threshold applied for the resource exclusion, or
an SL-RSSI threshold applied for the resource exclusion.

Clause 60: The method of clause 59, wherein the SL-RSRP threshold and the SL-RSSI threshold are configured by a network or preconfigured at the second UE.

Clause 61: The method of clause 57, wherein the second sidelink communication is a long-term evolution (LTE) sidelink communication, and the first sidelink communication is a new radio (NR) sidelink communication.

Clause 62: The method of clause 57, wherein collecting the sidelink sensing information further comprises:
performing, by the second UE, a channel sensing of the sidelink communication; and
measuring, by the second UE, at least one of: one or more SL-RSRPs or one or more SL-RSSIs for the one or more reserved resources.

Clause 63: A non-transitory computer-readable medium storing instructions that are executable by one or more processors of a user equipment (UE) in a sidelink communication, to perform a method, the method comprising:
determining, by a first sidelink communication module of the UE, a selection window;
setting, by the first sidelink communication module, at least one first threshold parameter for a resource exclusion at the first sidelink communication module;
initializing, by the first sidelink communication module, a candidate resource set including one or more resources in a first sidelink communication;
receiving, from a second sidelink communication module, at least one of: at least one second threshold parameter used for a resource exclusion at the second sidelink communication module, sidelink sensing information obtained by the second sidelink communication module, or resource reservation information collected by the second sidelink communication module;
determining, by the first sidelink communication module, one or more final candidate resources in the first sidelink communication using the at least one first threshold parameter and the at least one information received from the second sidelink communication module; and
reporting, by the first sidelink communication module, the determined one or more final candidate resources to a higher layer for selection of one or more transmission resources in the first sidelink communication.

Clause 64: A non-transitory computer-readable medium storing instructions that are executable by one or more processors of a second user equipment (UE) in a second sidelink communication, to perform a method, the method comprising:
collecting, by a second user equipment (UE) in the second sidelink communication, sidelink sensing information and resource reservation information for one or more reserved resources in the second sidelink communication;
determining, by the second UE, one or more candidate resources based on the sidelink sensing information for the one or more reserved resources in the second sidelink communication by performing a resource exclusion on the one or more candidate resources based on at least one threshold parameter;
selecting, by the second UE, one or more resources among the one or more candidate resources; and transmitting, to a first UE in a first sidelink communication, at least one of: the at least one threshold parameter used for the resource exclusion at the second UE, the sidelink sensing information, or the resource reservation information.

The invention claimed is:

1. A user equipment (UE), the UE comprising:
a memory storing an instruction; and
a processor configured to execute the instruction, for resource selection in a first sidelink communication, stored in the memory to:
set at least one first threshold parameter for a resource exclusion at the UE;
initialize one or more first candidate resources in the first sidelink communication;
obtain, at least one of: at least one second threshold parameter used for a resource exclusion in second sidelink communication, sidelink sensing information in the second sidelink communication, or resource reservation information in the second sidelink communication;
determine one or more second candidate resources from among the one or more first candidate resources using the at least one first threshold parameter and the obtained at least one information in the second sidelink communication; and
report one or more third candidate resources to a higher layer for selection of one or more transmission resources in the first sidelink communication based on the one or more second candidate resources,
wherein, the at least one first threshold parameter is determined based on information preconfigured by a network.

2. The UE of claim 1, wherein the at least one first threshold parameter is included in at least one of:
a list of initial threshold parameters for resource exclusion of one or more resources in the first sidelink communication, or
a list of initial threshold parameters for resource exclusion of one or more resources in the second sidelink communication.

3. The UE of claim 1, wherein the processor is further configured to:
increase the at least one first threshold parameter by an increment if the number of the one or more second candidate resources is smaller than total number of the one or more first candidate resources multiplied by X, where the X is indicated by the information preconfigured by the network.

4. The UE of claim 1, wherein the processor is further configured to:
initialize a candidate resource set including one or more resources in the first sidelink communication, if the number of the one or more second candidate resources is smaller than total number of the one or more first candidate resources multiplied by X, where the X is indicated by the information preconfigured by the network.

5. The UE of claim 1, wherein the processor is further configured to:
determine the one or more third candidate resources based on DRX active time.

6. The UE of claim 1, wherein the at least one first threshold parameter is determined based on at least one of: one or more priorities of one or more other UEs in a second sidelink communication, or one or more priorities associated with one or more transmissions in the first sidelink communication.

7. The UE of claim 1, wherein the sidelink sensing information in the second sidelink communication comprises: one or more sidelink measurement in the second sidelink communication.

8. The UE of claim 7, wherein in determining the one or more third candidate resources, the processor is further configured to execute the instruction stored in the memory to:
exclude, from the one or more first candidate resources, one or more resources having the one or more sidelink measurement greater than the at least one first threshold parameter.

9. The UE of claim 7, wherein the sidelink measurement in the second sidelink communication comprises at least one of:
SL-RSRP measurement in the second sidelink communication, and
SL-RSSI measurement in the second sidelink communication.

10. The UE of claim 1, wherein the at least one first threshold parameter is determined based on the information preconfigured by the network and total number of the one or more first candidate resources.

* * * * *